(12) United States Patent
Brown et al.

(10) Patent No.: US 7,456,838 B1
(45) Date of Patent: Nov. 25, 2008

(54) SYSTEM AND METHOD FOR CONVERTING A VERTEX PROGRAM TO A BINARY FORMAT CAPABLE OF BEING EXECUTED BY A HARDWARE GRAPHICS PIPELINE

(75) Inventors: Patrick R. Brown, Raleigh, NC (US); Mark J. Kilgard, Austin, TX (US); Robert Steven Glanville, Cupertino, CA (US)

(73) Assignee: NVIDIA Corporation, Santa Clara, CA (US)

( * ) Notice: Subject to any disclaimer, the term of this patent is extended or adjusted under 35 U.S.C. 154(b) by 642 days.

(21) Appl. No.: 11/062,060

(22) Filed: Feb. 18, 2005

Related U.S. Application Data

(60) Division of application No. 10/180,798, filed on Jun. 25, 2002, now Pat. No. 7,006,101, and a continuation-in-part of application No. 10/006,477, filed on Nov. 30, 2001, now Pat. No. 7,009,615, and a continuation-in-part of application No. 10/000,996, filed on Nov. 30, 2001, now Pat. No. 6,982,718, and a continuation-in-part of application No. 09/877,852, filed on Jun. 8, 2001, now Pat. No. 6,894,687, and a continuation-in-part of application No. 09/877,348, filed on Jun. 8, 2001, now Pat. No. 6,697,064, which is a continuation-in-part of application No. 09/877,851, filed on Jun. 8, 2001, now Pat. No. 7,162,716.

(51) Int. Cl.
*G06T 1/00* (2006.01)
*G09G 5/36* (2006.01)
*G09G 5/37* (2006.01)

(52) U.S. Cl. .................. 345/522; 345/556; 345/561; 345/563

(58) Field of Classification Search .......... 345/522, 345/506, 556, 561, 563, 427
See application file for complete search history.

(56) References Cited

U.S. PATENT DOCUMENTS 4,482,893 A 11/1984 Edelson .................. 340/723

(Continued)

FOREIGN PATENT DOCUMENTS

EP 0690430 A2 1/1996

(Continued)

OTHER PUBLICATIONS http://www.opengl.org/developers/documentation/extensions.html.

(Continued)

*Primary Examiner*—Kee M Tung
*Assistant Examiner*—Hau H Nguyen
(74) *Attorney, Agent, or Firm*—Zilka-Kotab, PC

(57) ABSTRACT

A system, method and computer program product are provided for programmable vertex processing. Initially, a vertex program is identified including branch labels and instruction sequences with branch commands. The vertex program is then converted to a binary format capable of being executed by a hardware graphics pipeline. The vertex program may then be executed in the binary format utilizing the hardware graphics pipeline for transforming vertices. As an option, the vertex program is initially written in a textual format capable of being read by a human prior to being converted.

16 Claims, 4 Drawing Sheets

U.S. PATENT DOCUMENTS

| | | | |
|---|---|---|---|
| 4,996,666 A | 2/1991 | Duluk, Jr. | 365/49 |
| 5,123,085 A | 6/1992 | Wells et al. | 395/121 |
| 5,193,148 A | 3/1993 | Alcorn et al. | 345/562 |
| 5,257,389 A | 10/1993 | Liu et al. | 382/305 |
| 5,410,660 A | 4/1995 | Divine et al. | 395/375 |
| 5,535,288 A | 7/1996 | Chen et al. | 382/236 |
| 5,572,634 A | 11/1996 | Duluk, Jr. | 395/119 |
| 5,574,835 A | 11/1996 | Duluk, Jr. et al. | 395/121 |
| 5,596,686 A | 1/1997 | Duluk, Jr. | 395/122 |
| 5,669,010 A | 9/1997 | Duluk, Jr. | 395/800.22 |
| 5,694,143 A | 12/1997 | Fielder et al. | 345/112 |
| 5,764,228 A | 6/1998 | Baldwin | 345/344 |
| 5,764,241 A | 6/1998 | Elliott et al. | 345/473 |
| 5,798,762 A | 8/1998 | Sfarti et al. | 345/420 |
| 5,798,770 A | 8/1998 | Baldwin | 345/506 |
| 5,812,072 A | 9/1998 | Masters | 341/55 |
| 5,815,695 A | 9/1998 | James et al. | 395/561 |
| 5,821,940 A | 10/1998 | Morgan et al. | 345/420 |
| 5,838,337 A | 11/1998 | Kimura et al. | 345/519 |
| 5,872,902 A | 2/1999 | Kuchkuda et al. | 395/130 |
| 5,914,721 A | 6/1999 | Lim | 345/421 |
| 5,926,647 A | 7/1999 | Adams et al. | 395/800.36 |
| 5,933,153 A | 8/1999 | Deering et al. | 345/501 |
| 5,959,689 A | 9/1999 | De Lange et al. | 348/571 |
| 5,966,532 A | 10/1999 | McDonald et al. | 395/701 |
| 5,974,538 A | 10/1999 | Wilmot, II | 712/218 |
| 5,977,987 A | 11/1999 | Duluk, Jr. | 345/441 |
| 5,977,997 A | 11/1999 | Vainsencher | 345/519 |
| 6,000,027 A | 12/1999 | Pawate et al. | 712/39 |
| 6,046,747 A | 4/2000 | Saunders et al. | 345/430 |
| 6,094,200 A | 7/2000 | Olsen et al. | 345/422 |
| 6,170,052 B1 | 1/2001 | Morrison | 345/426 |
| 6,172,679 B1 | 1/2001 | Lim | 345/421 |
| 6,198,488 B1 | 3/2001 | Lindholm et al. | 345/426 |
| 6,198,833 B1 | 3/2001 | Rangan et al. | 382/103 |
| 6,215,504 B1 | 4/2001 | Longhenry et al. | 345/443 |
| 6,219,071 B1 | 4/2001 | Krech, Jr. et al. | 345/503 |
| 6,226,003 B1 | 5/2001 | Akeley | 345/419 |
| 6,229,553 B1 | 5/2001 | Duluk, Jr. et al. | 345/506 |
| 6,242,343 B1 | 6/2001 | Yamazaki et al. | 438/633 |
| 6,246,415 B1 | 6/2001 | Grossman et al. | 345/422 |
| 6,252,608 B1 | 6/2001 | Snyder et al. | 345/473 |
| 6,268,875 B1 | 7/2001 | Duluk, Jr. et al. | 345/506 |
| 6,285,378 B1 | 9/2001 | Duluk, Jr. | 345/441 |
| 6,288,730 B1 | 9/2001 | Duluk, Jr. et al. | 345/552 |
| 6,295,599 B1 | 9/2001 | Hansen et al. | 712/32 |
| 6,304,265 B1 | 10/2001 | Harris et al. | 345/421 |
| 6,351,760 B1 | 2/2002 | Shankar et al. | 708/654 |
| 6,411,301 B1 | 6/2002 | Parikh et al. | 345/522 |
| 6,421,808 B1 | 7/2002 | McGeet et al. | 716/1 |
| 6,480,205 B1 | 11/2002 | Greene et al. | 345/631 |
| 6,732,259 B1 * | 5/2004 | Thekkath et al. | 712/233 |
| 6,771,264 B1 | 8/2004 | Duluk et al. | 712/236 |
| 7,002,588 B1 | 2/2006 | Lindholm et al. | 345/561 |
| 7,006,101 B1 | 2/2006 | Brown et al. | 345/561 |
| 7,170,513 B1 | 1/2007 | Voorhies et al. | 345/421 |
| 2002/0030685 A1 | 3/2002 | Brethour et al. | 345/503 |

FOREIGN PATENT DOCUMENTS

| | | |
|---|---|---|
| WO | 93/23816 | 11/1993 |
| WO | 97/05575 | 2/1997 |
| WO | 97/05576 | 2/1997 |
| WO | WO 98/28695 | 7/1998 |
| WO | WO 99/09473 | 2/1999 |
| WO | WO 99/52040 | 10/1999 |
| WO | 00/10372 | 3/2000 |
| WO | 00/11562 | 3/2000 |
| WO | 00/11602 | 3/2000 |
| WO | 00/11603 | 3/2000 |
| WO | 00/11604 | 3/2000 |
| WO | 00/11605 | 3/2000 |
| WO | 00/11607 | 3/2000 |
| WO | 00/11613 | 3/2000 |
| WO | 00/11614 | 3/2000 |
| WO | 00/19377 | 4/2000 |

OTHER PUBLICATIONS http://oss.sgi.com/projects/ogl-sample/registry/doc/rules.html.

Mard Olano and Trey Greer, "Triangle Scan Conversion using 2D Homogeneous Coordinates", 1997 SIGGRAPH/Eurographics Workshop, pp. 89-95.

Segal, Mark and Akeley, Kurt, The OpenGL Graphics System: A Specification (Version 1.2.1) Apr. 1, 1999.

Olano, Marc, "A Programmable Pipeline for Graphics Hardware", 1998, University of North Carolina at Chapel Hill.

Marc Olano et al., A Shading Language on Graphics Hardware: The PixelFlow Shading System Jul. 1998, Orlando, Florida.

Anselmo Lastra et al., Real-Time Programmable Shading, 1995, Chapel Hill, NC.

John Eyles et al., PixelFlow: The Realization, Hewlett-Packard Company Chapel Hill Graphics Lab, North Carolina.

Mark S. Peercy et al., Interactive Multi-Pass Programmable Shading, 2000.

Bartz, Dirk et al.; "Extending Graphics Hardware for Occlusion Queries in OpenGL"; Computer Graphics Lab, University of Tübingen.

Greene, Ned; "Hierarchical Polygon Tiling with Coverage Masks"; Apple Computer.

Greene, Ned; "Hierarchical Z-Buffer Visibility"; Apple Computer.

Xie, Feng et al; "Adaptive Hierarchical Visibility in a Tiled Architecture"; Intel Corporation.

"Conditioning Testing", London South Bank University http://www.scism.sbu.as.uk/law/Section5/chap6/s5c6p11.html.

Borgenstam, U; Svensson, J. Shaders, Chalmers University of Technology. http://ce.chalmers/se/old/undergraduate/D/EDA425/lectures/shaders.pdf.

Traditional Vertex Lighting Instructions http://directx.com/shader/vertex/instructions.htm.

Office Action Summary from U.S. Appl. No. 11/286,809 which was mailed Apr. 23, 2007.

Office Action Summary from U.S. Appl. No. 10/188,697 which was mailed Jun. 15, 2006.

Office Action Summary from U.S. Appl. No. 11/286,809 which was mailed Oct. 31, 2006.

Office Action Summary from U.S. Appl. No. 10/188,697 which was mailed Jun. 15, 2006.

Office Action from U.S. Appl. No. 10/188,697 which was mailed on Jan. 5, 2006.

Mitzukami, Etsuko. "The Accuracy of Floating Point Summations for CG-like Methods". Jul. 1997. Indiana University. pp. 1-3. http://www.cs.indiana.edu/pab/techreports/TR486.pdf.

Final Office Action Summary from U.S. Appl. No. 11/286,809 which was mailed on Aug. 6, 2007.

"Condition testing." London South Bank University, http://www.scism.sbu.ac.uk/law/Section5/chap6/s56p11.html.

Office Action Summary from U.S. Appl. No. 10/391,930 mailed on Jul. 28, 2005.

Final Office Action Summary from U.S. Appl. No. 10/391,930 mailed on Feb. 7, 2005.

Borgenstam, U.; Svensson, J. Shaders. Chalmers University of Technology. http://www.co.chalmers.sc/old/undergraduate/D/EDA425/lectures/shaders.pdf.

Traditional Vertex Lighting Instructions. http://www.directx.com/shaders/vertex/instructions.htm.

Notice of Allowance from U.S. Appl. No. 10/188,697 mailed on Sep. 21, 2006.

Office Action Summary from U.S. Appl. No. 10/391,930 mailed on Aug. 17, 2004.

Notice of Allowance from U.S. Appl. No. 10/391,930 mailed on Oct. 20, 2005.

Office Action Summary from U.S. Appl. No. 11/286,809 mailed on Jan. 7, 2008.

Notice of Allowance from U.S. Appl. No. 10/180,798 mailed on Jun. 13, 2005.

Office Action Summary from U.S. Appl. No. 10/180,798 mailed on Dec. 1, 2004.

Supplemental Notice of Allowability from U.S. Appl. No. 10/180,798 mailed on Nov. 15, 2005.

"How to Create OpenGL Extensions" pp. 1-7.

Final Office Action Summary from U.S. Appl. No. 11/286,809 mailed on Jul. 17, 2008.

* cited by examiner

SYSTEM AND METHOD FOR CONVERTING A VERTEX PROGRAM TO A BINARY FORMAT CAPABLE OF BEING EXECUTED BY A HARDWARE GRAPHICS PIPELINE

RELATED APPLICATION(S)

The present application is a divisional of an application filed Jun. 25, 2002 under Ser. No. 10/180,798, now U.S. Pat. No. 7,006,101 which, in turn, is a continuation-in-part of a parent application filed Jun. 8, 2001 under Ser. No. 09/877,851, now U.S. Pat. No. 7,162,716 a parent application filed Jun. 8, 2001 under Ser. No. 09/877,348; now U.S. Pat. No. 6,697,064 a third parent application filed Jun. 8, 2001 under Ser. No. 09/877,852; now U.S. Pat. No. 6,894,687 a parent application filed Nov. 30, 2001 under Ser. No. 10/000,996; now U.S. Pat. No. 6,982,718 and a parent application filed Nov. 30, 2001 under Ser. No. 10/006,477, now U.S. Pat. No. 7,009,615 which are each incorporated herein by reference.

FIELD OF THE INVENTION

The present invention relates to computer graphics, and more particularly to graphics application program interfaces.

BACKGROUND OF THE INVENTION

Graphics application program interfaces (API's) have been instrumental in allowing applications to be written to a standard interface and to be run on multiple platforms, i.e. operating systems, hardware implementations, etc. Examples of such graphics API's include Open Graphics Library (OpenGL®) and Direct3D™ transform and lighting pipelines. OpenGL® is the computer industry's cross-platform standard graphics API for defining 2-D and 3-D graphic images. With OpenGL®, an application can create the same effects in any operating system using any OpenGL®-adhering graphics adapter. OpenGL® specifies a set of commands or immediately executed functions. The set of commands directs a drawing action and/or control subsequent drawing actions.

Thus, in any computer system which supports this OpenGL® standard, the operating system(s) and application software programs can make calls according to the standard, without knowing exactly any specifics regarding the hardware configuration of the system. This is accomplished by providing a complete library of low-level graphics manipulation commands, which can be used to implement graphics operations.

A significant benefit is afforded by providing a predefined set of commands in graphics API's such as OpenGL®. By restricting the allowable operations, such commands can be highly optimized in the driver and hardware implementing the graphics API. On the other hand, one major drawback of this approach is that changes to the graphics API are difficult and slow to be implemented. It may take years for a new feature to be broadly adopted across multiple vendors.

With the impending integration of transform operations into high speed graphics chips and the higher integration levels allowed by semiconductor manufacturing, it is now possible to make a significant portion of the geometry pipeline accessible to the application writer. There is thus a need to exploit this trend in order to afford increased flexibility in visual effects and computer graphics programming capabilities.

SUMMARY

A system, method and computer program product are provided for programmable vertex processing. Initially, a vertex program is identified including branch labels and instruction sequences with branch commands. The vertex program is then converted to a binary format capable of being executed by a hardware graphics pipeline. The vertex program may then be executed in the binary format utilizing the hardware graphics pipeline for transforming vertices. As an option, the vertex program is initially written in a textual format capable of being read by a human prior to being converted.

BRIEF DESCRIPTION OF THE DRAWINGS

The foregoing and other aspects and advantages are better understood from the following detailed description of a preferred embodiment of the invention with reference to the drawings, in which.

DETAILED DESCRIPTION

Figure 1A:
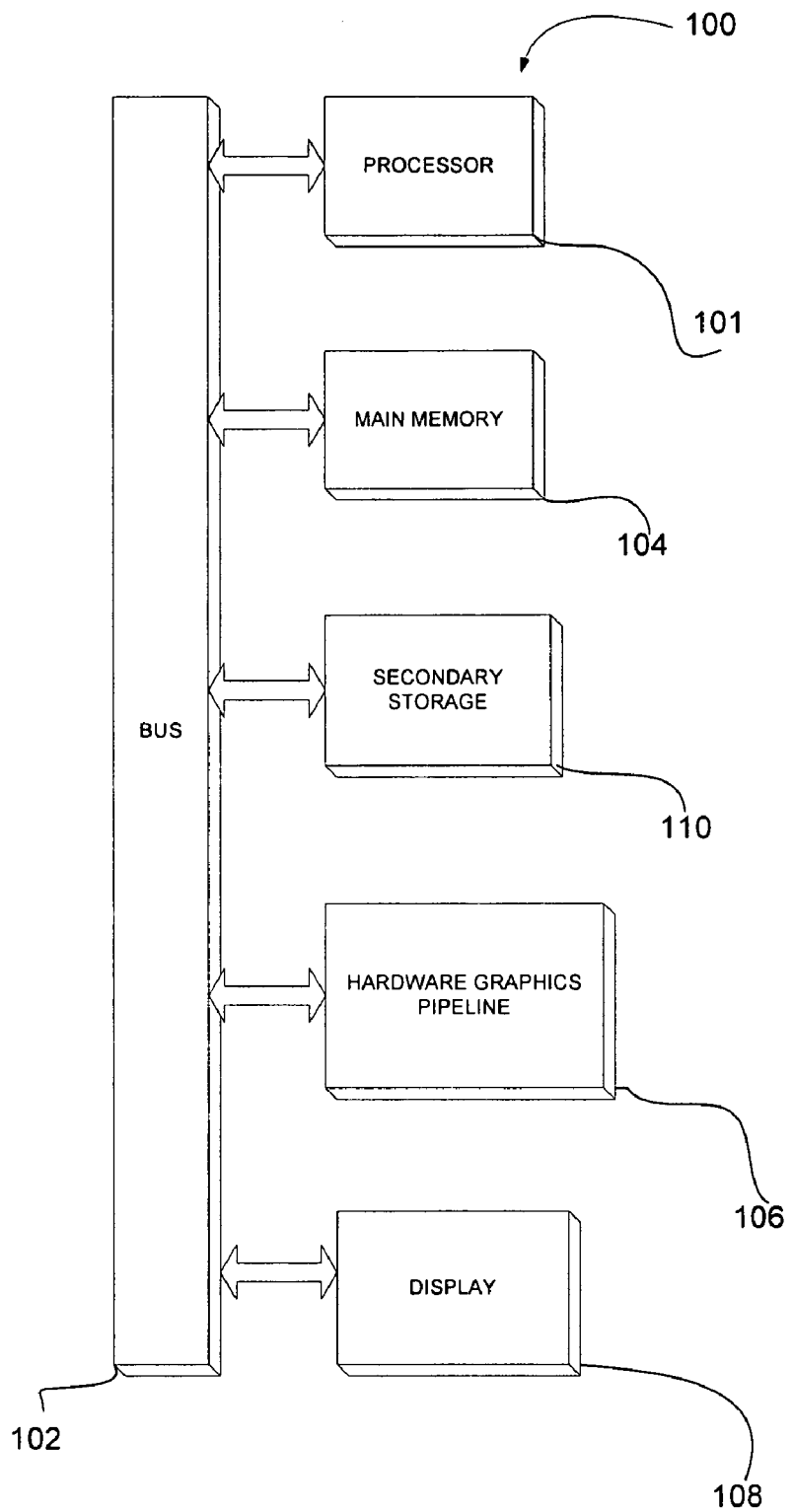
FIG. 1A is a block diagram of a digital processing system embodying a method and system, in accordance with one embodiment.

FIG. 1A is a block diagram of a digital processing system embodying a method and system, in accordance with one embodiment. With reference to FIG. 1A, a computer graphics system is provided that may be implemented using a computer 100. The computer 100 includes one or more processors, such as processor 101, which is connected to a communication bus 102.

The bus 102 can be implemented with one or more integrated circuits, and perform some logic functions; for example, a typical personal computer includes chips known as north bridge and south bridge chips. The computer 100 also includes a main memory 104. Control logic (software) and data are stored in the main memory 104 which may take the form of random access memory (RAM). The computer also includes a hardware graphics pipeline 106 and a display 108, i.e. a computer monitor.

The computer 100 may also include a secondary storage 110. The secondary storage 110 includes, for example, a hard disk drive and/or a removable storage drive, representing a floppy disk drive, a magnetic tape drive, a compact disk drive, etc. The removable storage drive reads from and/or writes to a removable storage unit in a well known manner. Computer programs, or computer control logic algorithms, are stored in the main memory 104 and/or the secondary storage 110. Such computer programs, when executed, enable the computer 100 to perform various functions. Memory 104 and storage 110 are thus examples of computer-readable media, or simply memory.

In one embodiment, the techniques to be set forth are performed by the hardware graphics pipeline 106 which may take the form of hardware. Such hardware implementation may include a microcontroller or any other type of custom or application specific integrated circuit (ASIC). In yet another embodiment, the method of the present invention may be carried out in part on the processor 101 by way of a computer program stored in the main memory 104 and/or the secondary storage 110 of the computer 100. One exemplary architecture for the hardware graphics pipeline 106 will be set forth during reference to FIG. 1B.

Figure 1B:
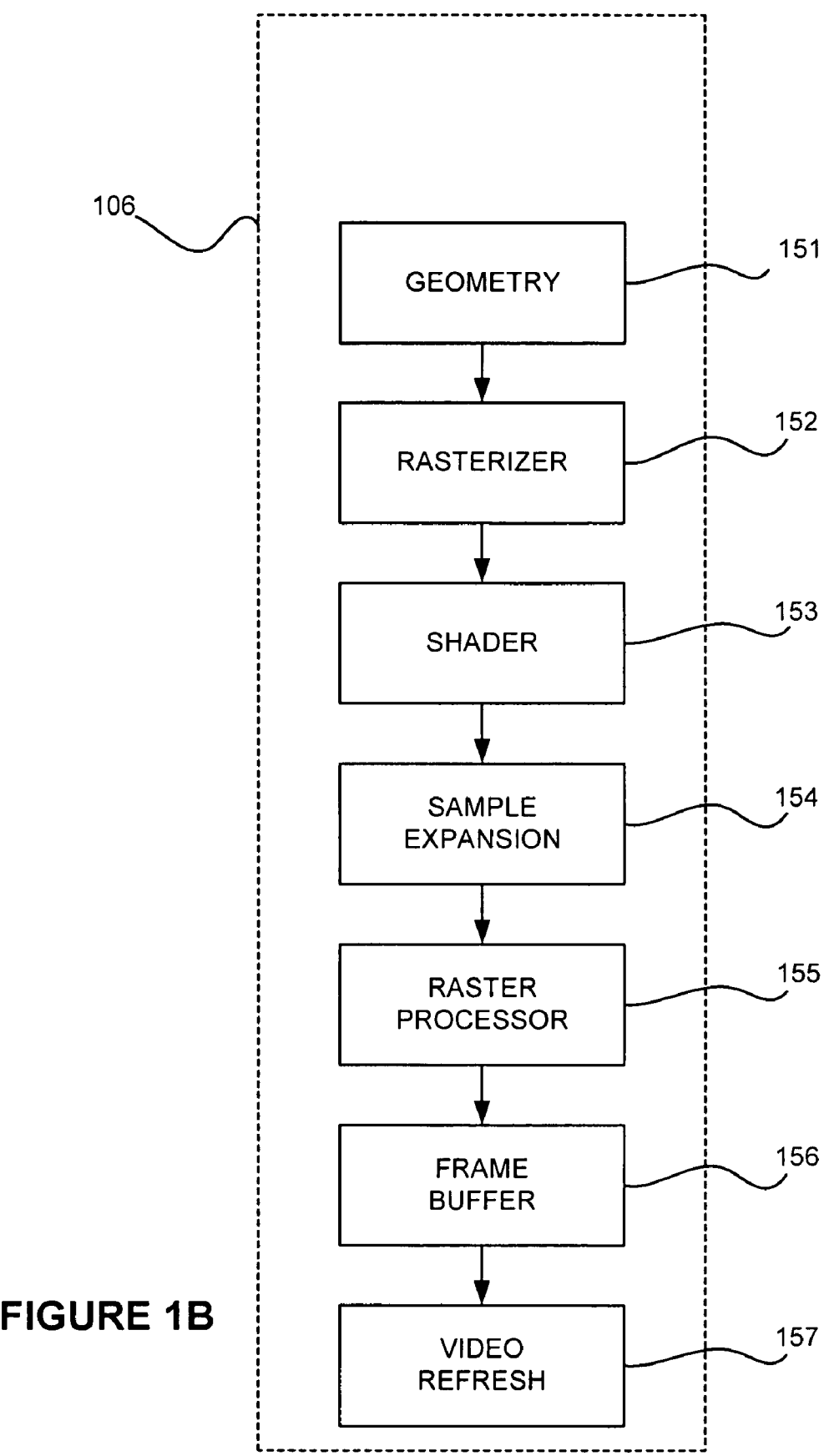
FIG. 1B illustrates a more detailed diagram showing the internal structure of one exemplary embodiment of the hardware graphics pipeline of FIG. 1A.

FIG. 1B illustrates a more detailed diagram showing the internal structure of one exemplary embodiment of the hardware graphics pipeline 106 of FIG. 1A. As shown, a geometry stage 151 is provided which transforms primitives into a screen-aligned coordinate system. Other computations may be performed by the geometry stage 151 such as lighting to determine the visual properties (e.g., color, surface normal, texture coordinates) of each vertex describing the primitives.

The transformed vertices form the input for a rasterizer 152. The rasterizer 152 computes a fragment for each pixel covered by each of the primitives. A coverage mask stored with the fragment indicates which portions of the pixel the fragment covers.

Also included is a shader 153 that computes the final fragment, e.g. by applying texture maps or shader programs to the fragment. A sample expansion stage 154 then optionally generates multiple samples for each fragment.

With continuing reference to FIG. 1B, after multi-sampling, the individual samples are sent to a raster-processor (ROP) 155 as if they were regular fragments. The raster-processor 155 performs various operations on the fragments, including z/stencil testing and color or alpha blending. This may require the raster-processor 155 to read a frame buffer memory 156 in order to retrieve the destination z-values or the destination color. To this end, the final pixel color and z-values are written back to the frame buffer memory 156.

When all primitives in the scene have been rendered in this manner, the contents of the frame buffer memory 156 are scanned out by a video refresh unit 157 and sent to the display 108.

In one embodiment, all of the foregoing components of the graphics system 106 (and possibly memories, such as texture memory) may be situated on a single semiconductor platform. Of course, the various modules may also be situated separately or in various combinations of semiconductor platforms per the desires of the user.

In the present description, a single semiconductor platform may refer to a sole unitary semiconductor-based integrated circuit or chip. It should be noted that the term single semiconductor platform may also refer to multi-chip modules with increased connectivity which simulate entirely on-chip operation, and make substantial improvements over utilizing a conventional CPU and bus implementation.

An interface may be used in conjunction with the various components set forth in FIGS. 1A and 1B. In one embodiment, such interface may include at least in part the Open Graphics Library (OpenGL®), Direct3D™ application program interfaces (APIs), a proprietary application program interface, or the like. OpenGL® is the computer industry's standard cross-platform application program interface (API) for defining 2-D and 3-D graphic images.

With OpenGL®, an application can create the same effects in any operating system using any OpenGL®-adhering graphics adapter (assuming support in the adapter for the same version of OpenGL® and support for the same OpenGL® extensions). OpenGL® specifies a set of commands or immediately executed functions. The set of commands directs a drawing action and/or control subsequent drawing actions. OpenGL® and Direct3D™ APIs are commonly known to those of ordinary skill, and more information on the same may be found by reference to the OpenGL® Specification Version 1.3 which is incorporated herein by reference in its entirety.

As will soon become apparent, an interface is provided that allows for branching during programmable graphics processing. Initially, a first instruction defined by the graphics application program interface is identified. A first operation is performed on graphics data based on the first instruction utilizing the hardware graphics pipeline.

At some point, the present technique may involve branching to an additional instruction defined by the graphics application program interface other than a subsequent sequential instruction. Next, another operation is performed on the graphics data based on the additional instruction utilizing the hardware graphics pipeline. Thus, branching is achieved. More information regarding an exemplary embodiment of such branching capability will now be set forth in the following descriptions and with reference to FIGS. 2-4.

To accomplish this branching, a data structure may be provided that may be stored in memory for branching during programmable processing utilizing the graphics application program interface in conjunction with the hardware graphics pipeline. Such data structure may include an instruction set defined by the graphics application program interface capable of carrying out a plurality of operations utilizing the hardware graphics pipeline.

In one embodiment, the operations of which the instruction set is capable may include a branch operation, a call operation, a return operation, a cosine operation, a sine operation, a floor operation, a fraction operation, a set-on-equal-to operation, a set false operation, a set-on-greater-than operation, a set-on-less-than-or-equal operation, a set-on-not-equal-to operation, a set true operation, a no operation, an address register load operation, an address register load with rounding operation, an address register add operation, a set sign operation, a move operation, a multiply operation, an addition operation, a multiply and addition operation, a reciprocal operation, a reciprocal square root operation, a three component dot product operation, a four component dot product operation, a distance vector operation, a minimum operation, a maximum operation, a set-on-less-than operation, a set-on-greater-or-equal-than operation, an exponential base two (2) operation, a logarithm base two (2) operation, an exponential operation, a logarithm operation, and/or a light coefficients operation. More information regarding such exemplary operations will be set forth hereinafter in greater detail.

The instruction set may include a branch operation for branching among different instructions out of sequential order. As an option, the branching may occur conditionally. This may be accomplished utilizing a register such as a condition code register. The condition code register may include a multi-component condition code register for storing a plurality of condition codes. Such condition codes may, in turn, be associated with x-values, y-values, z-values, and w-values. Optionally, the condition code register may include floating point components.

For example, the condition code register may be used in the context of a test to determine whether to branch or not. Such tests may include less than, greater than, greater than or equal, less than or equal, equal, not equal, false, and/or true. Optionally, the testing may include programmable testing, or even multiple tests.

It should be noted that various other operations beyond the branch operation may be conditioned in such a manner. In addition to facilitating branching, the condition code register may be used, for example, to mask the writing of the graphics data to a destination register.

Moreover, the graphics data written to the destination register may be individually masked for each of the x-values, y-values, z-values, and w-values. Optionally, each instruction defined by the graphics application program interface may be capable of modifying the condition codes, again by optionally using a mask.

Figure 2:
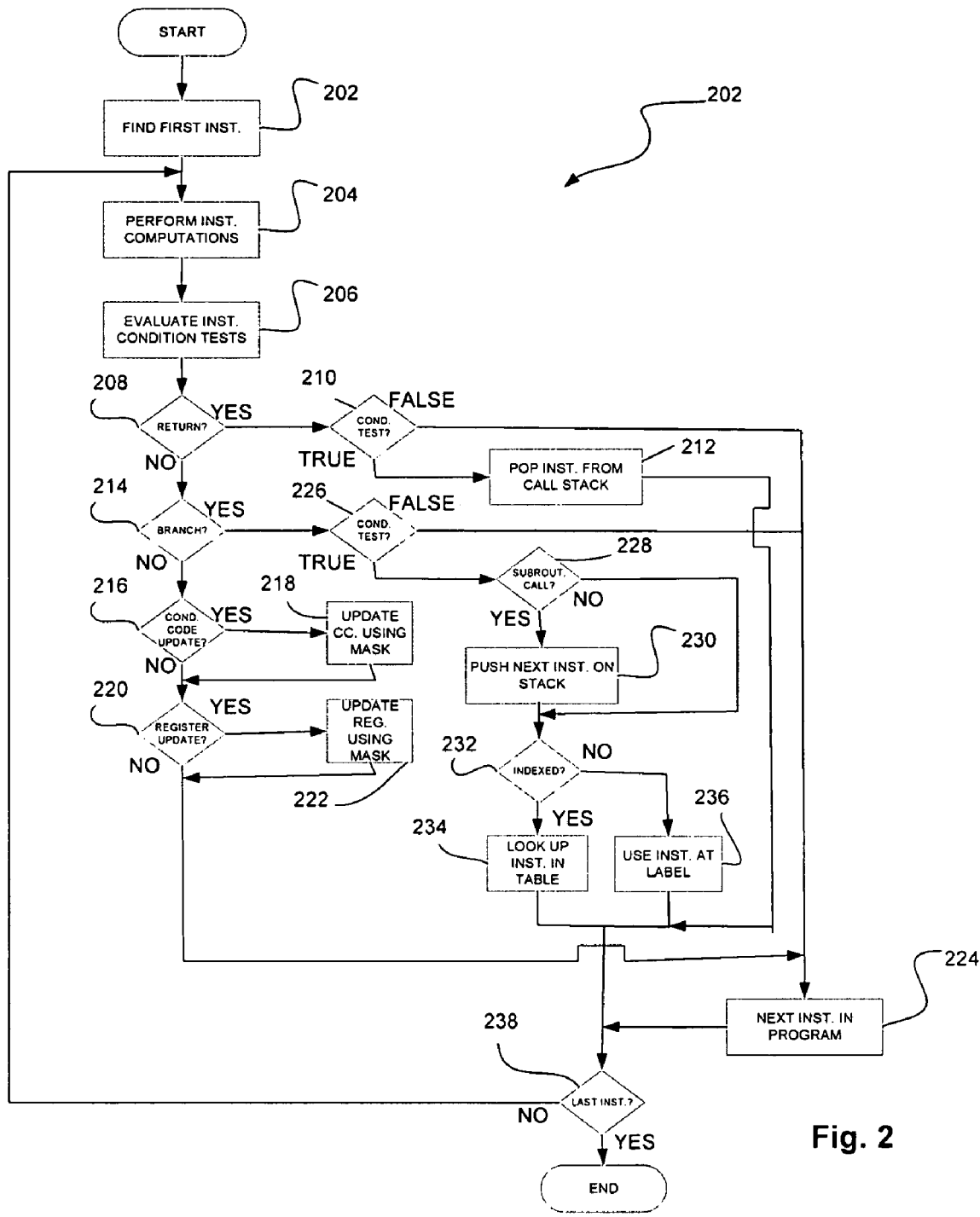
FIG. 2 illustrates a method for branching during programmable processing utilizing a graphics application program interface in conjunction with a hardware graphics pipeline, in accordance with one embodiment.

FIG. 2 illustrates a method 200 for branching during programmable processing utilizing a graphics application program interface in conjunction with a hardware graphics pipeline, in accordance with one embodiment. It should be noted that the present method 200 may be carried out as an extension to an application program interface in the context of the above architecture. Of course, the present techniques may be carried out in any desired context.

Initially, in operation 202, a first instruction defined by the graphics application program interface is identified. Next, in operation 204, an operation is performed on graphics data based on such instruction utilizing the hardware graphics pipeline. Such operation may vary from a return operation, update operation, mathematical operation, or any other desired operation (more examples will follow hereinafter). In the context of the present description, the graphics data may include vertex data, pixel data, fragment data, or any other type of graphics data.

As mentioned earlier, various instruction operations may be conditioned based on a test involving contents of a condition code register. In operation 206, such test, if any, associated with the operation corresponding to the present instruction is evaluated for executing the instruction. In particular, four tests may be performed, each involving any one of four components of a condition code register.

Thus, the operation associated with the instruction may possibly go unperformed if the test is false. Further, a result of the operation associated with the instruction may possibly go unwritten if the test is false.

If the instruction calls for a particular operation (i.e. a return operation, branch operation, condition code update operation, register update operation, etc.), a particular process may be effected.

For example, if the present instruction calls for a return operation, as determined by decision 208, it is then determined whether any of the tests involving condition codes in operation 206 passes. See decision 210. If not, the present method 200 continues to a next instruction. See operation 224. If, however, the test passes in decision 210, an instruction reference is popped off a call stack and program execution continues with the popped instruction. See operation 212.

In effect, a return operation is carried out whereby the method 200 continues at a predetermined instruction (i.e. an instruction immediately following an instruction executed before branching to a pre-defined subroutine or the like). More information about such return operation will be set forth in greater detail hereinafter in the context of an exemplary interface.

As seen from decision 214, if it is determined that the present instruction calls for a branch operation, it is again determined whether any of the tests involving condition codes in operation 206 passes. See operation 226. If not, the present method 200 continues to a next instruction. See operation 224.

If, however, the test passes in decision 226, it is then determined in decision 228 whether the branch operation involves a subroutine call. If a subroutine call is involved, a reference to the immediately following instruction is pushed onto the call stack. See operation 230. It is then determined whether the instruction is indexed in decision 232.

If it is determined that the instruction is indexed in decision 232, the index may be used to look up an entry in a table. As an option, the index may be taken from a specified address register component or even computed. The present method 200 may then branch to the instruction associated with the entry, as indicated in operation 234. It should be noted that such index may be computed utilizing an address register.

If, however, it is determined that the instruction is not indexed in decision 232, the branching may be effected using an instruction label. See operation 236. Such an instruction label may be referred to explicitly by branch or subroutine call instructions. Instruction labels may also be defined or used at any point in the body of a program, and can be used in instructions or branch table entries before being defined in the program string. Optionally, instruction labels need not necessarily be used. For example, an instruction may be identified by line number. Optionally, a loop may be executed utilizing the foregoing branching, where the branch instruction at the end of the loop may refer to the top of the loop. Moreover, the branch operation may branch to a predetermined subroutine. A plurality of nested subroutines [i.e. four (4)] may even be called.

As mentioned earlier, various instructions defined by the graphics application program interface may be capable of modifying the condition codes. Moving to decision 216, it may be determined in decision 216 whether the present instruction calls for a condition code update. If so, in operation 218, the condition code(s) in the condition code register is updated, optionally using a mask. As an option, such mask may be computed in operation 206.

In a similar manner, it may also be determined in decision 220 whether the present instruction calls for a register update. If so, in operation 222, the contents of a register are updated, optionally using a mask. Again, such mask may be computed in operation 206. As mentioned earlier, the graphics data written to a destination register may be individually masked for each of the x-values, y-values, z-values, and w-values.

Finally, it is determined whether the last instruction has been executed in decision 238, and the method 200 is conditionally continued based thereon.

Figure 3:
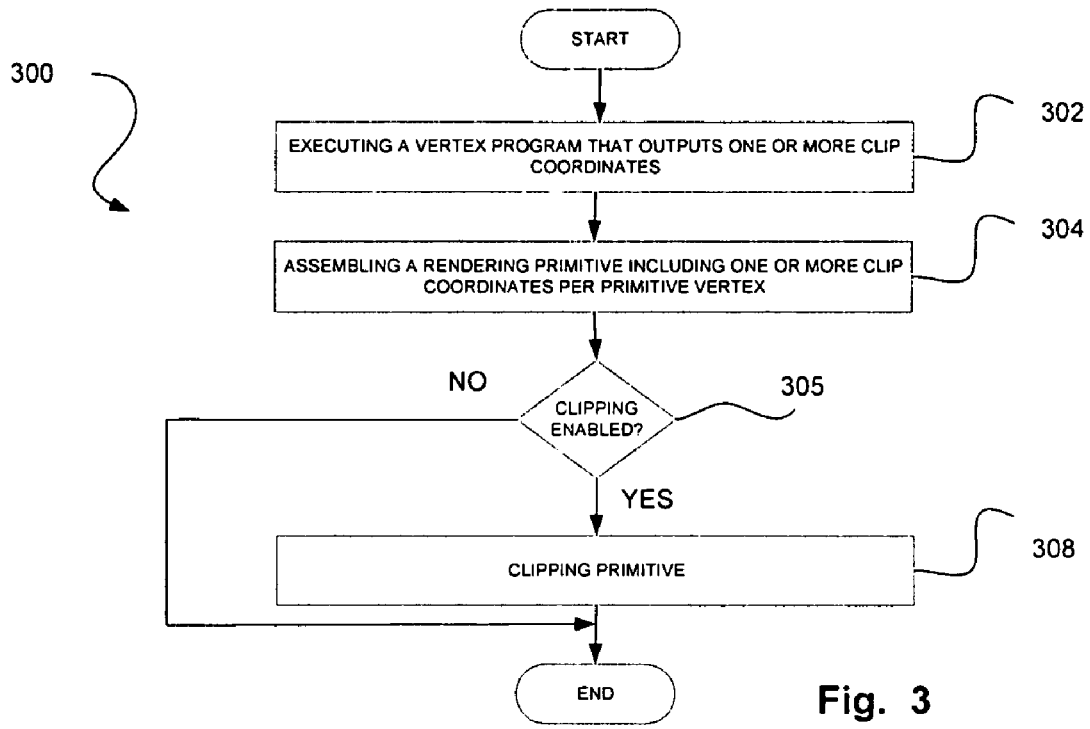
FIG. 3 illustrates a method for performing clipping in the context of programmable vertex processing.

FIG. 3 illustrates a method 300 for performing clipping in the context of programmable vertex processing. As mentioned earlier, at least one of the operations may include a clipping operation.

A vertex program that outputs one or more clip distances is initially executed in operation 302. Such one or more clip distances may include a plurality of independent sets. A rendering primitive including one or more clip distances per primitive vertex is then assembled in operation 304. It is then determined in decision 305 whether clipping is enabled for a particular clip distance.

If it is determined that clipping is enabled (as determined by decision 305), the primitive is clipped so that if the clip distance was interpolated over the primitive, regions of the primitive where the interpolated clip distance was negative are not rasterized. In an alternate embodiment, the primitive may be clipped so that if the clip distance was interpolated over the primitive, regions of the primitive where the interpolated clip distance was negative are discarded. Note operation 306.

Figure 4:
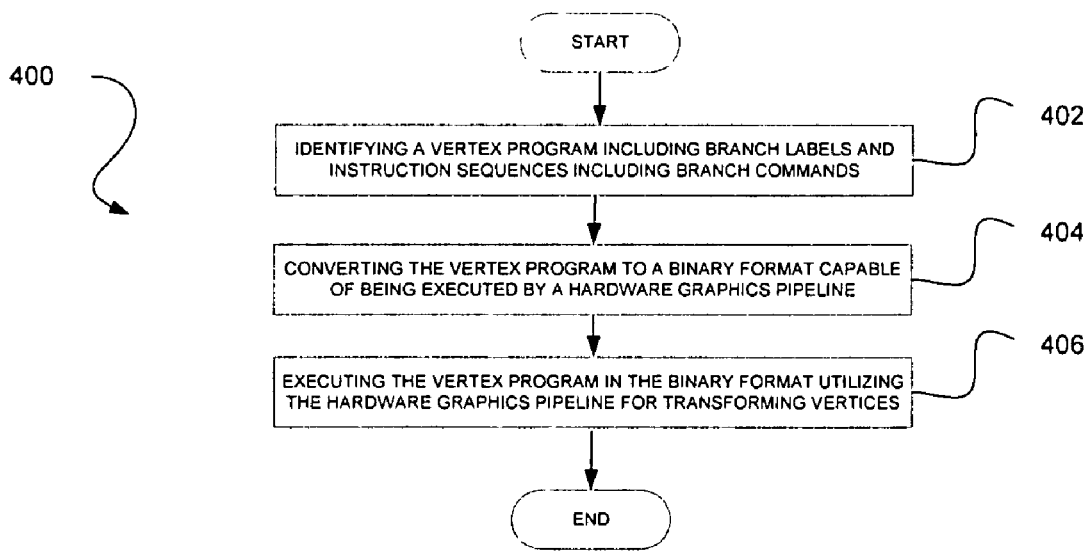
FIG. 4 illustrates another method that may be provided for programmable vertex processing, in accordance with one embodiment.

FIG. 4 illustrates another method 400 that may be provided for programmable vertex processing, in accordance with one embodiment. Initially, in operation 402, a vertex program is identified including branch labels (i.e. branch targets, etc.) and instruction sequences with branch commands. As an option, the vertex program is initially written in a textual format capable of being read by a human prior to being converted.

The vertex program is then converted to a binary format capable of being executed by a hardware graphics pipeline. See operation 404. The vertex program may then be executed in the binary format utilizing the hardware graphics pipeline for transforming vertices, as indicated in operation 406.

EMBODIMENTS FOR APPLICATION PROGRAM INTERFACES

The following description is set forth in the context of OpenGL® which is commonly known to those of ordinary skill. More particularly, the following information is set forth in the context of the OpenGL® Specification Version 1.3, which is incorporated herein by reference in its entirety. It should be noted that, in the present description, OpenGL® API commands and tokens are prefixed by "gl" and "GL_," respectively. Also, OpenGL® extension commands and tokens are, by convention, often suffixed by letters indicating the company that proposed the extension, for example, "NV" or "_NV," respectively. When the context is clear, such prefixes and suffices are dropped for brevity and clarity.

Options

Various options will now be set forth which may or may not be implemented in the context of the present exemplary embodiment.

An RCC instruction may exist for various reasons. For example, it may exist to perform numeric operations that may avoid overflow and underflow issues.

A program may use condition codes to avoid extra computations. For example, in the case of evaluating the OpenGL® lighting model for a given light, if the diffuse dot product is negative (roughly ½ the time for random geometry), the only contribution to the light is ambient. In this case, condition codes and branching can skip over a number of unneeded instructions. See Table 1 for exemplary register values and operations.

TABLE 1

```
# R0 holds accumulated light color
# R2 holds normal
# R3 holds computed light vector
# R4 holds computed half vector
# c[0] holds ambient light/material product
# c[1] holds diffuse light/material product
# c[2].xyz holds specular light/material product
# c[2].w holds specular exponent
DP3C    R1.x, R2, R3;           # diffuse dot product
ADD     R0, R0, c[0];           # accumulate ambient
BRA     pointsAway (LT.x)       # skip rest if diffuse dot < 0
MOV     R1.w, c[2].w;
DP3     R1.y, R2, R4;           # specular dot product
LIT     R1, R1;                 # compute expontiated specular
MAD     R4, c[1], R0.y;         # accumulate diffuse
MAD     R4, c[2], R0.z;         # accumulate specular
pointsAway:
    ...                         # continue execution
```

Subroutines and branch tables may be used in various ways. An application can use a single generic program with a set of specifically tuned subroutines. For example, if a program evaluated the OpenGL® lighting model using multiple lights (some local, some infinite), it may provide a small set of lighting routines tuned to specific light types and use the address register and branch table to select the proper routine at run time. See Table 2 for an example.

TABLE 2

```
# c[0].xyz holds the light position
# c[0].w holds the light type (0=disabled, 1=infinite, 2=local)
# A0.x holds the offset of the program parameter holding the
#      attributes of the light in question.
# A0.y may be loaded with the light type.
JMPTABLE {
    disabledLight,
    infiniteLight,
    localLight,
};
...
disabledLight:
    RET;                        # do nothing
localLight:
    # perform computations assuming the light is local
    ...
    RET;
infiniteLight:
    # perform computations assuming the light is infinite
    ...
    RET;
...
ARL     A0.y, c[A0.x].w;
CAL     [A0.y];
...
```

It should be noted that the foregoing example can be further optimized by noting that the "disabled" (index 0) case does nothing. The condition code register can be used to avoid the call/return here. See Table 3.

TABLE 3

```
ARLC    A0.y,   c[A0.x].w;
CAL     CAL     [A0.y] (GT.y);
```

Conventional OpenGL® clip planes can be supported in vertex programs in various ways. The clip distance in the OpenGL® specification can be evaluated with a simple DP4 instruction that writes to one of the six clip distance registers. Primitives may automatically be clipped to the half-space where o[CLPx]>=0, which matches the definition in the spec. See Table 4 for an example.

TABLE 4

```
# R0 holds eye coordinates
# c[0] holds eye-space clip plane coefficients
DP4 o[CLP0].x, R0, c[0];
```

It should be noted that the clip plane or clip distance volume corresponding to the o[CLPn] register used may be enabled. The clip distance registers allow for clip distance volumes to be computed more-or-less arbitrarily. To approximate clipping to a sphere of radius <n>, the following code of Table 5 may be used.

TABLE 5

```
# R0 holds eye coordinates
# c[0].xyz holds sphere center
# c[0].w holds the square of the sphere radius
SUB R1.xyz, R0, c[0];           # distance vector
DP3 R1.w, R1, R1;               # compute distance squared
SUB o[CLP0].x, c[0].w, R1.w;    # compute r^2 – d^2
```

Since the clip distance is interpolated linearly over a primitive, the clip distance evaluated at a point may represent a piecewise-linear approximation of the true distance. The approximation may become increasingly more accurate as the primitive is tessellated more finely.

Looping can be achieved in vertex programs in any desired manner. For example, simple loops may be achieved using a general purpose floating-point register component as a counter. The following code of Table 6 calls a function named "function" <n> times, where <n> is specified in a program parameter register component.

TABLE 6

```
# c[0].x holds the number of iterations to execute
# c[0].y holds the initial index value
# c[0].z holds the constant –1.0 (used for the iteration count)
# c[0].w holds the index step value
    ARLC A1, c[0];
startLoop:
    CAL    function (GT.x);   # if (counter > 0) function( );
                              # Note: A1.y can be used for
                              # indexing in function( ).
    ARAC   A1.xy, A1;         # counter--;
                              # index += loopStep;
    BRA    startLoop (GT.x);  # if (counter > 0) goto start;
endLoop:
    ...
```

More complex loops (where a loop counter may be needed for indexed addressing into the program parameter array) may be achieved using the ARA instruction. See Table 7A.

TABLE 7A

```
# c[0].x holds the number of iterations to execute
# c[0].y holds the initial loop counter
# c[0].z holds the constant –1.0 (used for the iteration count)
# c[0].w holds the loop counter step value
    ARLC   A1, c[0];
    BRA    endLoop (LE.x);    # if iterations < 0 goto end; startLoop:
    CAL    function;          # A1.y can be used for indexing
    ARAC   A1.xy, A1;         # iterations--;
                              # loopCounter += loopStep;
    BRA    (GT.x);            # if (iterations > 0) goto start;
endLoop:
    ...
```

The present description does not necessarily call for added support for vertex state programs beyond the VP1 execution environment. Vertex state programs are a little-used feature of NV_vertex_program and don't perform particularly well. They may be still supported for compatibility with the original NV_vertex_program specification, but they may not necessarily be extended to support new features.

Exemplary Application

One useful area where the foregoing interface may be applied is in "skinning" applications. In such applications, a single vertex may be transformed by multiple matrices, and then a weighted sum of the transformed results is computed. Additionally, in "paletted" skinning, only a small set of matrices may apply. Combining the two, the vector ARL and ARR instructions, multiple scalars, and conditional branching may be very useful. For example, such branching may be used to select a variable number of transformations during the skinning operation. See Table 7B.

TABLE 7B

```
ARLC A0, v[14];              # load 4 palette indices at once
DP4 R1.x, c[A0.x+0], v[0];   # 1st matrix transform
DP4 R1.y, c[A0.x+1], v[0];
DP4 R1.z, c[A0.x+2], v[0];
DP4 R1.w, c[A0.x+3], v[0];
```

TABLE 7B-continued

```
MUL R0, R1, v[12].x;         # accumulate weighted sum in R0
BRA end (LT.y);              # stop on a negative matrix index
DP4 R1.x, c[A0.y+0], v[0];   # 2nd matrix transform
DP4 R1.y, c[A0.y+1], v[0];
DP4 R1.z, c[A0.y+2], v[0];
DP4 R1.w, c[A0.y+3], v[0];
MAD R0, R1, v[12].y, R0;     # accumulate weighted sum in R0
BRA end (LT.z);              # stop on a negative matrix index
...                          # 3rd and 4th matrix transform
ARLC AD, v[15];              # load next four palette indices
BRA end (LT.x);
DP4 R1.x, c[A0.x+0], v[0];   # 5th matrix transform
DP4 R1.y, c[A0.x+1], v[0];
DP4 R1.z, c[A0.x+2], v[0];
DP4 R1.w, c[A0.x+3], v[0];
MAD R0, R1, v[13].x, R0;     # accumulate weighted sum in R0
BRA end (LT.y);              # stop on a negative matrix index
...                          # 6th, 7th, and 8th matrix
transform
end:
...                          # any additional instructions
```

The amount of code used by the foregoing example could further be reduced using a subroutine performing four transformations at a time. See Table 7C.

TABLE 7C

```
ARLC  A0, v[14];   # load first four indices
CAL   skin4;       # do first four transformations
BRA   end (LT);    # end if any of the first 4 indices was < 0
ARLC  A0, v[15];   # load second four indices
CAL   skin4;       # do second four transformations
end:
...                # any additional instructions
```

The foregoing example does skinning with a variable number of matrices and weights. It is also optimized so one does not have to do multiple independent address register loads. In particular, such optimizations are outlined in Table 7D.

TABLE 7D

```
an address register load instruction can load multiple independent
components of an integer address register
other instructions can use any address register component to access
individual array elements determined at run-time
```

Additional information will now be set forth in a topic-by-topic format. This information is meant to expand upon what is commonly known to those of ordinary skill, as exemplified by the OpenGL® 1.3 specification.

Clipping

When the GL is in vertex program mode, the view volume may be restricted to the individual clip distance volumes derived from the per-vertex clip distances (o[CLP0]-o[CLP5]). Clip distance volumes are applied if and only if per-vertex clip distances are not supported in the vertex program execution environment. A point P belonging to the primitive under consideration is in the clip distance volume numbered n if and only if $c\_n(P) >= 0$, where $c\_n(P)$ is the interpolated value of the clip distance CLPn at the point P. For point primitives, $c\_n(P)$ is simply the clip distance for the vertex in question. For line and triangle primitives, per-vertex clip distances are interpolated using a weighted mean, with weights derived according to various algorithms. (See, for example, sections 3.4 and 3.5 of the OpenGL® 1.3 specification)

Client-defined clip planes or clip distance volumes are enabled with the generic Enable command and disabled with the Disable command. The value of the argument to either command is CLIP PLANEi where i is an integer between 0 and n; specifying a value of i enables or disables the plane equation with index i. The constants obey CLIP PLANEi=CLIP PLANE0+i.

Vertex Programs

The conventional GL vertex transformation model (See sections 2.10 through 2.13 of the OpenGL® 1.2.1 specification) is a configurable, but essentially hard-wired, sequence of per-vertex computations based on a canonical set of per-vertex parameters and vertex transformation related state such as transformation matrices, lighting parameters, and texture coordinate generation parameters.

The general success and utility of the conventional GL vertex transformation model reflects its basic correspondence to the typical vertex transformation requirements of 3D applications.

However, when the conventional GL vertex transformation model is not sufficient, the vertex program mode provides a substantially more flexible model for vertex transformation. The vertex program mode permits applications to define their own vertex programs.

More information on this topic that is well known to those of ordinary skill may be found in Sections 2.10-2.13 of the OpenGL® 1.3 specification.

Vertex Program Execution Environment

The vertex program execution environment is an operational model that defines how a program is executed. The execution environment includes a set of instructions, a set of registers, and semantic rules defining how operations are performed. There are three vertex program execution environments, VP1, VP1.1, and VP2. The environment names are taken from the mandatory program prefix strings found at the beginning of all vertex programs. The VP1.1 execution environment is a minor addition to the VP1 execution environment, so references to the VP1 execution environment below apply to both VP1 and VP1.1 execution environments except where otherwise noted.

The vertex program instruction set consists primarily of floating-point 4-component vector operations operating on per-vertex attributes and program parameters. Vertex programs execute on a per-vertex basis and operate on each vertex completely independently from the processing of other vertices. Vertex programs execute without data hazards so results computed in one operation can be used immediately afterwards. Vertex programs produce a set of vertex result vectors that becomes the set of transformed vertex parameters used by primitive assembly.

In the VP1 environment, vertex programs execute a finite fixed sequence of instructions with no branching or looping. In the VP2 environment, vertex programs support conditional and unconditional branches and four levels of subroutine calls.

The vertex program register set consists of six types of registers described in the following sections.

Vertex Attribute Registers

The Vertex attribute registers are sixteen 4-component vector floating-point registers containing the current vertex's per-vertex attributes. These registers are numbered 0 through 15. These registers are private to each vertex program invocation and are initialized at each vertex program invocation by the current vertex attribute state specified with VertexAttribNV commands. These registers are read-only during vertex program execution. The VertexAttribNV commands used to update the vertex attribute registers can be issued both outside and inside of Begin/End pairs. Vertex program execution is provoked by updating vertex attribute zero. Updating vertex attribute zero outside of a Begin/End pair is ignored without generating any error (identical to the Vertex command operation).

Exemplary commands are shown in Table 8.

TABLE 8 void VertexAttrib{1234}{sfd}NV(uint index, T coords);
void VertexAttrib{1234}{sfd}vNV(uint index, T coords);
void VertexAttrib4ubNV(uint index, T coords);
void VertexAttrib4ubvNV(uint index, T coords);

Such commands specify the particular current vertex attribute indicated by index. The coordinates for each vertex attribute are named x, y, z, and w. The VertexAttrib1NV family of commands sets the x coordinate to the provided single argument while setting y and z to 0 and w to 1. Similarly, VertexAttrib2NV sets x and y to the specified values, z to 0 and w to 1; VertexAttrib3NV sets x, y, and z, with w set to 1, and VertexAttrib4NV sets all four coordinates. The error INVALID_VALUE is generated if index is greater than 15.

No conversions are applied to the vertex attributes specified as type short, float, or double. However, vertex attributes specified as type ubyte are converted. See, for example, Table 2.6 of the OpenGL® 1.3 specification.

Further exemplary commands are set forth in Table 9.

TABLE 9 void VertexAttribs{1234}{sfd}vNV(uint index, sizei n, T coords[ ]);
void VertexAttribs4ubvNV(uint index, sizei n, GLubyte coords[ ]);

These specify a contiguous set of n vertex attributes. The effect of VertexAttribs{1234} {sfd} vNV(index, n, coords) is the same as the command sequence shown in Table 10.

TABLE 10

```
#define NUM k /* where k is 1, 2, 3, or 4 components */
int i;
for (i=n-1; i>=0; i--) {
    VertexAttrib{NUM}{sfd}vNV(i+index, &coords[i*NUM]);
}
```

VertexAttribs4ubvNV behaves similarly.

The VertexAttribNV calls equivalent to VertexAttribsNV are issued in reverse order so that vertex program execution is provoked when index is zero only after all the other vertex attributes have first been specified.

The set and operation of vertex attribute registers are identical for both VP1 and VP2 execution environments.

Program Parameter Registers

The program parameter registers are a set of 4-component floating-point vector registers containing the vertex program parameters. In the VP1 execution environment, there are 96 registers, numbered 0 through 95. In the VP2 execution environment, there are 256 registers, numbered 0 through 255. This relatively large set of registers is intended to hold parameters such as matrices, lighting parameters, and constants required by vertex programs. Vertex program parameter registers can be updated in one of two ways: by the ProgramParameterNV commands outside of a Begin/End pair or by a vertex state program executed outside of a Begin/End pair.

Exemplary commands are shown in Table 11.

TABLE 11 void ProgramParameter4fNV(enum target, uint index, float x, float y, float z, float w)
void ProgramParameter4dNV(enum target, uint index, double x, double y, double z, double w)

These specify the particular program parameter indicated by index. The coordinates values x, y, z, and w are assigned to the respective components of the particular program parameter. Target may be VERTEX_PROGRAM_NV.

The commands:

void ProgramParameter4dvNV(enum target, uint index, double *params); void ProgramParameter4fvNV(enum target, uint index, float *params) operate identically to ProgramParameter4fNV and ProgramParameter4dNV, respectively, except that the program parameters are passed as an array of four components.

The error INVALID_VALUE is generated if the specified index is greater than or equal to the number of program parameters in the execution environment (96 for VP1, 256 for VP2).

Exemplary commands are shown in Table 12.

TABLE 12 void ProgramParameters4dvNV(enum target, uint index, uint num, double *params);
void ProgramParameters4fvNV(enum target, uint index, uint num, float *params);

This specifies a contiguous set of num program parameters. The effect is the same as the following code in Table 13.

TABLE 13 for (i=index; i<index+num; i++) {
    ProgramParameter4{fd}vNV(i, params + i*4);
}

The error INVALID_VALUE is generated if sum of <index> and <num> is greater than the number of program parameters in the execution environment (96 for VP1, 256 for VP2).

The program parameter registers are shared to all vertex program invocations within a rendering context. ProgramParameterNV command updates and vertex state program executions are serialized with respect to vertex program invocations and other vertex state program executions.

Writes to the program parameter registers during vertex state program execution can be maskable on a per-component basis.

The initial value of all 96 (VP1) or 256 (VP2) program parameter registers is (0,0,0,0).

Address Registers

The address registers are 4-component vector registers with signed 3210-bit integer components. In the VP1 execution environment, there is only a single address register (A0) and only the x component of the register is accessible. In the VP2 execution environment, there are two address registers (A0 and A1), of which all four components are accessible. The address registers are private to each vertex program invocation and are initialized to (0,0,0,0) at every vertex program invocation. These registers can be written during vertex program execution (but not read) and their values can be used for as a relative offset for reading vertex program parameter registers. Only the vertex program parameter registers can be read using relative addressing (writes using relative addressing are not supported).

See, for example, the discussion of relative addressing of program parameters and the discussion of the ARL instruction herein.

Temporary Registers

The temporary registers are 4-component floating-point vector registers used to hold temporary results during vertex program execution. In the VP1 execution environment, there are 12 temporary registers, numbered 0 through 11. In the VP2 execution environment, there are 16 temporary registers, numbered 0 through 15. These registers are private to each vertex program invocation and initialized to (0,0,0,0) at every vertex program invocation. These registers can be read and written during vertex program execution. Writes to these registers can be maskable on a per-component basis.

In the VP2 execution environment, there is one additional temporary pseudo-register, "CC". CC is treated as unnumbered, write-only temporary register, whose sole purpose is to allow instructions to modify the condition code register without overwriting the contents of any temporary register.

Vertex Result Registers

The vertex result registers are 4-component floating-point vector registers used to write the results of a vertex program. There are 15 result registers in the VP1 execution environment, and 21 in the VP2 execution environment. Each register value is initialized to (0,0,0,1) at the invocation of each vertex program. Writes to the vertex result registers can be maskable on a per-component basis. These registers are named in Table 14 and further discussed below.

TABLE 14

| Vertex Result Register Name | Description | Component Interpretation |
| --- | --- | --- |
| HPOS | Homogeneous clip space position | (x,y,z,w) |
| COL0 | Primary color (front-facing) | (r,g,b,a) |
| COL1 | Secondary color (front-facing) | (r,g,b,a) |
| BFC0 | Back-facing primary color | (r,g,b,a) |
| BFC1 | Back-facing secondary color | (r,g,b,a) |
| FOGC | Fog coordinate | (f,*,*,*) |
| PSIZ | Point size | (p,*,*,*) |
| TEX0 | Texture coordinate set 0 | (s,t,r,q) |
| TEX1 | Texture coordinate set 1 | (s,t,r,q) |
| TEX2 | Texture coordinate set 2 | (s,t,r,q) |
| TEX3 | Texture coordinate set 3 | (s,t,r,q) |
| TEX4 | Texture coordinate set 4 | (s,t,r,q) |
| TEX5 | Texture coordinate set 5 | (s,t,r,q) |
| TEX6 | Texture coordinate set 6 | (s,t,r,q) |
| TEX7 | Texture coordinate set 7 | (s,t,r,q) |
| CLP0(*) | Clip distance 0 | (d,*,*,*) |
| CLP1(*) | Clip distance 1 | (d,*,*,*) |
| CLP2(*) | Clip distance 2 | (d,*,*,*) |
| CLP3(*) | Clip distance 3 | (d,*,*,*) |
| CLP4(*) | Clip distance 4 | (d,*,*,*) |
| CLP5(*) | Clip distance 5 | (d,*,*,*) |

Table 14 illustrates the vertex result registers. (*) Registers CLP0 through CLP5, are available only in the VP2 execution environment.

HPOS is the transformed vertex's homogeneous clip space position. The vertex's homogeneous clip space position is converted to normalized device coordinates and transformed to window coordinates. See, for example, section 2.10 and section 2.11 of the OpenGL® 1.3 specification. Further processing (subsequent to vertex program termination) is responsible for clipping primitives assembled from vertex program-generated vertices (See, for example, section 2.10 of the OpenGL® 1.3 specification) but all client-defined clip planes are treated as if they are disabled when vertex program mode is enabled.

Four distinct color results can be generated for each vertex. COL0 is the transformed vertex's front-facing primary color. COL1 is the transformed vertex's front-facing secondary color. BFC0 is the transformed vertex's back-facing primary color. BFC1 is the transformed vertex's back-facing secondary color.

Primitive coloring may operate in two-sided color mode. This behavior is enabled and disabled by calling Enable or Disable with the symbolic value VERTEX_PROGRAM_TWO_SIDE_NV. The selection between the back-facing colors and the front-facing colors depends on the primitive of which the vertex is a part. If the primitive is a point or a line segment, the front-facing colors are always selected. If the primitive is a polygon and two-sided color mode is disabled, the front-facing colors are selected. If it is a polygon and two-sided color mode is enabled, then the selection is based on the sign of the (clipped or unclipped) polygon's signed area computed in window coordinates. This facingness determination may be identical to the well known two-sided lighting facingness determination. (See section 2.13.1 of the OpenGL® 1.3 specification)

The selected primary and secondary colors for each primitive are clamped to the range [0,1] and then interpolated across the assembled primitive during rasterization with at least 8-bit accuracy for each color component.

FOGC is the transformed vertex's fog coordinate. The register's first floating-point component is interpolated across the assembled primitive during rasterization and used as the fog distance to compute per-fragment the fog factor when fog is enabled. However, if both fog and vertex program mode are enabled, but the FOGC vertex result register is not written, the fog factor is overridden to 1.0. The register's other three components are ignored.

Point size determination may operate in program-specified point size mode. This behavior is enabled and disabled by calling Enable or Disable with the symbolic value VERTEX_PROGRAM_POINT_SIZE_NV. If the vertex is for a point primitive and the mode is enabled and the PSIZ vertex result is written, the point primitive's size is determined by the clamped x component of the PSIZ register. Otherwise (because vertex program mode is disabled, program-specified point size mode is disabled, or because the vertex program did not write PSIZ), the point primitive's size is determined by the point size state (the state specified using the PointSize command).

The PSIZ register's x component is clamped to the range zero through either the hi value of ALIASED_POINT_SIZE_RANGE if point smoothing is disabled or the hi value of the SMOOTH_POINT_SIZE_RANGE if point smoothing is enabled. The register's other three components are ignored.

If the vertex is not for a point primitive, the value of the PSIZ vertex result register is ignored.

TEX0 through TEX7 are the transformed vertex's texture coordinate sets for texture units 0 through 7. These floating-point coordinates are interpolated across the assembled primitive during rasterization and used for accessing textures. If the number of texture units supported is less than eight, the values of vertex result registers that do not correspond to existent texture units are ignored.

CLP0 through CLP5, available only in the VP2 execution environment, are the transformed vertex's clip distances. These floating-point coordinates are used by post-vertex program clipping process (See, for example, section 2.11 of the OpenGL® 1.3 specification).

The Condition Code Register

The VP2 execution environment provides a single four-component vector called the condition code register. Each component of this register is one of four enumerated values: GT (greater than), EQ (equal), LT (less than), or UN (unordered). The condition code register can be used to mask writes to registers and to evaluate conditional branches.

Most vertex program instructions can optionally update the condition code register. When a vertex program instruction updates the condition code register, a condition code component is set to LT if the corresponding component of the result is less than zero, EQ if it is equal to zero, GT if it is greater than zero, and UN if it is NaN (not a number).

The condition code register is initialized to a vector of EQ values each time a vertex program executes.

There is no condition code register available in the VP1 execution environment.

Semantic Meaning for Vertex Attributes and Program Parameters

One important distinction between the conventional GL vertex transformation mode and the vertex program mode is that per-vertex parameters and other state parameters in vertex program mode do not have dedicated semantic interpretations the way that they do with the conventional GL vertex transformation mode.

For example, in the conventional GL vertex transformation mode, the Normal command specifies a per-vertex normal. The semantic that the Normal command supplies a normal for lighting is established because that is how the per-vertex attribute supplied by the Normal command is used by the conventional GL vertex transformation mode. Similarly, other state parameters such as a light source position have semantic interpretations based on how the conventional GL vertex transformation model uses each particular parameter.

In contrast, vertex attributes and program parameters for vertex programs have no pre-defined semantic meanings. The meaning of a vertex attribute or program parameter in vertex program mode is defined by how the vertex attribute or program parameter is used by the current vertex program to compute and write values to the Vertex Result Registers. This is the reason that per-vertex attributes and program parameters for vertex programs are numbered instead of named.

For convenience however, the existing per-vertex parameters for the conventional GL vertex transformation mode (vertices, normals, colors, fog coordinates, vertex weights, and texture coordinates) are aliased to numbered vertex attributes. This aliasing is specified in Table 15. The table includes how the various conventional components map to the 4-component vertex attribute components.

TABLE 15

| Vertex Attribute Register Number | Conventional Per-vertex Parameter | Conventional Per-vertex Parameter Command | Conventional Component Mapping |
|---|---|---|---|
| 0 | vertex position | Vertex | x,y,z,w |
| 1 | vertex weights | VertexWeightEXT | w,0,0,1 |
| 2 | normal | Normal | x,y,z,1 |
| 3 | primary color | Color | r,g,b,a |
| 4 | secondary color | SecondaryColorEXT | r,g,b,1 |
| 5 | fog coordinate | FogCoordEXT | fc,0,0,1 |
| 6 | — | — | — |
| 7 | — | — | — |
| 8 | texture coord 0 | MultiTexCoord(GL_TEXTURE0_ARB, . . . ) | s,t,r,q |
| 9 | texture coord 1 | MultiTexCoord(GL_TEXTURE1_ARB, . . . ) | s,t,r,q |
| 10 | texture coord 2 | MultiTexCoord(GL_TEXTURE2_ARB, . . . ) | s,t,r,q |
| 11 | texture coord 3 | MultiTexCoord(GL_TEXTURE3_ARB, . . . ) | st,r,q |
| 12 | texture coord 4 | MultiTexCoord(GL_TEXTURE4_ARB, . . . ) | s,t,r,q |
| 13 | texture coord 5 | MultiTexCoord(GL_TEXTURE5_ARB, . . . ) | s,t,r,q |
| 14 | texture coord 6 | MultiTexCoord(GL_TEXTURE6_ARB, . . . ) | s,t,r,q |
| 15 | texture coord 7 | MultiTexCoord(GL_TEXTURE7_ARB, . . . ) | s,t,r,q |

Table 15 thus shows aliasing of vertex attributes with conventional per-vertex parameters.

Only vertex attribute zero is treated special because it is the attribute that provokes the execution of the vertex program; this is the attribute that aliases to the Vertex command's vertex coordinates.

The result of a vertex program is the set of post-transformation vertex parameters written to the Vertex Result Registers. All vertex programs may write a homogeneous clip space position, but the other Vertex Result Registers can be optionally written.

Clipping and culling are not the responsibility of vertex programs because these operations assume the assembly of multiple vertices into a primitive. View frustum clipping is performed subsequent to vertex program execution. Clip planes are not supported in the VP1 execution environment. Clip planes are supported indirectly via the clip distance (o[CLPx]) registers in the VP2 execution environment.

Vertex Program Specification

Vertex programs are specified as an array of ubytes. The array is a string of ASCII characters encoding the program.

The command:

LoadProgramNV(enum target, uint id, sizei len, const ubyte *program);

loads a vertex program when the target parameter is VERTEX_PROGRAM_NV. Multiple programs can be loaded with different names. id names the program to load. The name space for programs is the positive integers (zero is reserved). The error INVALID_VALUE occurs if a program is loaded with an id of zero. The error INVALID_OPERATION is generated if a program is loaded for an id that is currently loaded with a program of a different program target. Managing the program name space and binding to vertex programs is discussed later. "program" is a pointer to an array of unsigned bytes that represents the program being loaded. The length of the array is indicated by len.

A second program target type known as vertex state programs is discussed herein.

At program load time, the program is parsed into a set of tokens possibly separated by white space. Spaces, tabs, newlines, carriage returns, and comments are considered whitespace. Comments begin with the character "#" and are terminated by a newline, a carriage return, or the end of the program array.

The Backus-Naur Form (BNF) grammar below specifies the syntactically valid sequences for several types of vertex programs. The set of valid tokens can be inferred from the grammar. The token " " represents an empty string and is used to indicate optional rules. A program is invalid if it contains any undefined tokens or characters.

The grammar provides for three different vertex program types, corresponding to the three vertex program execution environments. VP1, VP1.1, and VP2 programs match the grammar rules <vp1-program>, <vp11-program>, and <vp2-program>, respectively. Some grammar rules correspond to features or instruction forms available only in certain execution environments. Rules beginning with the prefix "vp1-" are available only to VP1 and VP1.1 programs. Rules beginning with the prefixes "vp11-" and "vp2-" are available only to VP1.1 and VP2 programs, respectively. See Table 16 for examples.

TABLE 16

| <program> | ::= <vp1-program> |
|---|---|
| | \| <vp11-program> |
| | \| <vp2-program> |
| <vp1-program> | ::= "!!VP1.0" <programBody> "END" |
| <vp11-program> | ::= "!!VP1.1" <programBody> "END" |
| <vp2-program> | ::= "!!VP2.0" <programBody> "END" |
| <programBody> | ::= <vp2-branchTable> <programText> |
| <programText> | ::= <programTextItem> <programText> |
| | \| "" |
| <programTextItem> | ::= <instruction> ";" |
| | \| <vp2-instructionLabel> |

TABLE 16-continued

| | |
|---|---|
| <instruction> | ::= <ARL-instruction> |
| | \| <VECTORop-instruction> |
| | \| <SCALARop-instruction> |
| | \| <BINop-instruction> |
| | \| <TRIop-instruction> |
| | \| <vp2-BRA-instruction> |
| | \| <vp2-RET-instruction> |
| | \| <vp2-ARA-instruction> |
| <ARL-instruction> | ::= <vp1-ARL-instruction> |
| | \| <vp2-ARL-instruction> |
| <vp1-ARL-instruction> | ::= "ARL" <maskedAddrReg> "," <scalarSrc> |
| <vp2-ARL-instruction> | ::= <vp2-ARLop> <maskedAddrReg> "," <vectorSrc> |
| <vp2-ARLop> | ::= "ARL" \| "ARLC" |
| | \| "ARR" \| "ARRC" |
| <VECTORop-instruction> | ::= <VECTORop> <maskedDstReg> "," <vectorSrc> |
| <VECTORop> | ::= "LIT" |
| | \| "MOV" |
| | \| <vp11-VECTORop> |
| | \| <vp2-VECTORop> |
| <vp11-VECTORop> | ::= "ABS" |
| <vp2-VECTORop> | ::= "ABS" \| "ABSC" |
| | \| "FLR" \| "FLRC" |
| | \| "FRC" \| "FRCC" |
| | \|        "LITC" |
| | \|        "MOVC" |
| | \| "SSG" \| "SSGC" |
| <SCALARop-instruction> | ::= <SCALARop> <maskedDstReg> "," <scalarSrc> |
| <SCALARop> | ::= "EXP" |
| | \| "LOG" |
| | \| "RCP" |
| | \| "RSQ" |
| | \| <vp2-SCALARop> |
| <vp2-SCALARCp> | ::= "COS" \| "COSC" |
| | \| "EX2" \| "EX2C" |
| | \| "LG2" \| "LG2C" |
| | \|        "EXPC" |
| | \|        "LOGC" |
| | \|        "RCPC" |
| | \|        "RSQC" |
| <BINop-instruction> | ::= <BINop> <maskedDstReg> "," <vectorSrc> "," |
| | <vectorSrc> |
| <BINop> | ::= "ADD" |
| | \| "DP3" |
| | \| "DP4" |
| | \| "DST" |
| | \| "MAX" |
| | \| "MIN" |
| | \| "MUL" |
| | \| "SGE" |
| | \| "SLT" |
| | \| <vp11-BINop> |
| | \| <vp2-BINop> |
| <vp11-BINop> | ::= "DPH" |
| <vp2-BINop> | ::=        "ADDC" |
| | \|        "DP3C" |
| | \|        "DP4C" |
| | \| "DPH" \| "DPHC" |
| | \|        "DSTC" |
| | \|        "MAXC" |
| | \|        "MINC" |
| | \|        "MULC" |
| | \| "SEQ" \| "SEQC" |
| | \| "SFL" \| "SFLC" |
| | \|        "SGEC" |
| | \| "SGT" \| "SGTC" |
| | \|        "SLTC" |
| | \| "SLE" \| "SLEC" |
| | \| "SNE" \| "SNEC" |
| | \| "STR" \| "STRC" |
| <TRIop-instruction> | ::= <TRIop> <maskedDscReg> "," <vectorSrc> "," |
| | <vectorSrc> "," <vectorSrc> |
| <TRIop> | ::= "MAD" |
| | \| <vp2-TRIop> |
| <vp2-TRIop> | ::= "MADC" |
| <vp2-BRA-instruction> | ::= <vp2-BRANCHop> <vp2-branchTarget> |
| | <vp2-branchCondition> |
| <vp2-BRANCHop> | ::= "BRA" |
| | \| "CAL" |
| <vp2-RET-instruction> | ::= "RET" <vp2-branchCondition> |

TABLE 16-continued

| | |
|---|---|
| <vp2-ARA-instruction> | ::= <vp2-ARAop> <maskedAddrReg> "," <addrRegister> |
| <vp2-ARAoP> | ::= "ARA" \| "ARAC" |
| <scalarSrc> | ::= <baseScalarSrc> |
| | \| <vp2-absScalarSrc> |
| <vp2-absScalarSrc> | ::= <optionalSign> "\|" <baseScalarSrc> "\|" |
| <baseScalarSrc> | ::= <optionalSign> <srcRegister> <scalarSuffix> |
| <vectorSrc> | ::= <baseVectorSrc> |
| | \| <vp2-absVectorSrc> |
| <vp2-absVectorSrc> | ::= <optionalSign> "\|" <baseVectorSrc> "\|" |
| <baseVectorSrc> | ::= <optionalSign> <srcRegister> <swizzleSuffix> |
| <srcRegister> | ::= <vtxAttribRegister> |
| | \| <progParamRegister> |
| | \| <tempRegister> |
| <maskedDstReg> | ::= <dstRegister> <optionalWriteMask> <optionalCCMask> |
| <dstRegister> | ::= <vtxResultRegister> |
| | \| <tempRegister> |
| | \| <vp2-nullRegister> |
| <vp2-nullRegister> | ::= "CC" |
| <vp2-branchCondition> | ::= <optionalCCMask> |
| <vp2-branchTarget> | ::= <vp2-absoluteBranch> |
| | \| <vp2-indexedBranch> |
| <vp2-absoluteBranch> | ::= <vp2-branchLabel> |
| <vp2-indexedBranch> | ::= "[" <scalarAddr> <vp2-indexedBrOffset> "]" |
| <vp2-indexedBrOffset> | ::= "" |
| | \| "+" <vp2-indexedBrBase> |
| <vp2-indexedBrBase> | ::= decimal integer from 0 to 15 inclusive |
| <vtxAttribRegister> | ::= " v" "[" vtxAttribRegNum "]" |
| <vtxAttribRegNum> | ::= decimal integer from 0 to 15 inclusive |
| | \| "OPOS" |
| | \| "WGHT" |
| | \| "NRML" |
| | \| "COL0" |
| | \| "COL1" |
| | \| "FOGC" |
| | \| "TEX0" |
| | \| "TEX1" |
| | \| "TEX2" |
| | \| "TEX3" |
| | \| "TEX4" |
| | \| "TEX5" |
| | \| "TEX6" |
| | \| "TEX7" |
| <progParamRegister> | ::= <absProgParamReg> |
| | \| <relProgParamReg> |
| <absProgParamReg> | ::= "c" "[" <progParamRegNum> "]" |
| <progParamRegNum> | ::= <vp1-progParamRegNum> |
| | \| <vp2-progParamRegNum> |
| <vp1-progParamRegNum> | ::= decimal integer from 0 to 95 inclusive |
| <vp2-progParamRegNum> | ::= decimal integer from 0 to 255 inclusive |
| <relProgParamReg> | ::= "c" "[" <scalarAddr> <relProgParamOffset> "]" |
| <relProgParamOffset> | ::= "" |
| | \| "+" <progParamPosOffset> |
| | \| "−" <progParamNegOffset> |
| <progParamPosOffset> | ::= <vp1-progParamPosOff> |
| | \| <vp2-progParamPosOff> |
| <vp1-progParamPosOff> | ::= decimal integer from 0 to 63 inclusive |
| <vp2-progParamPosOff> | ::= decimal integer from 0 to 255 inclusive |
| <progParamNegOffset> | ::= <vp1-progParamNegOff> |
| | \| <vp2-progParamNegOff> |
| <vp1-progParamNegOff> | ::= decimal integer from 0 to 64 inclusive |
| <vp2-progParamNegOff> | ::= decimal integer from 0 to 256 inclusive |
| <tempRegister> | ::= "R0" \| "R1" \| "R2" \| "R3" |
| | \| "R4" \| "R5" \| "R6" \| "R7" |
| | \| "R8" \| "R9" \| "R10" \| "R11" |
| <vp2-tempRegister> | ::= "R12" \| "R13" \| "R14" \| "R15" |
| <vtxResultRegister> | ::= "o" "[" vtxResultRegName "]" |
| <vtxResultRegName> | ::= "HPOS" |
| | \| "COL0" |
| | \| "COL1" |
| | \| "BFC0" |
| | \| "BFC1" |
| | \| "FOGC" |
| | \| "PSIZ" |
| | \| "TEX0" |
| | \| "TEX1" |
| | \| "TEX2" |
| | \| "TEX3" |
| | \| "TEX4" |

TABLE 16-continued

| | |
|---|---|
| | \| "TEX5" |
| | \| "TEX6" |
| | \| "TEX7" |
| <scalarAddr> | ::= <addrRegister> "." <addrRegisterComp> |
| <maskedAddrReg> | ::= <addrRegister> <addrWriteMask> |
| <addrRegister> | ::= "A0" |
| | \| <vp2-addrRegister> |
| <vp2-addrRegister | ::= "A1" |
| <addrRegisterComp> | ::= "x" |
| | \| <vp2-addrRegisterComp> |
| <vp2-addrRegisterComp> | ::= "y" |
| | \| "z" |
| | \| "w" |
| <addrWriteNask> | ::= "." "x" |
| | \| <vp2-addrWriteMask> |
| <vp2-addrWriteMask> | ::= "" |
| | \| "." "y" |
| | \| "." "x" "y" |
| | \| "." "z" |
| | \| "." "x" "z" |
| | \| "." "y" "z" |
| | \| "." "x" "y" "z" |
| | \| "." "w" |
| | \| "." "x" "w" |
| | \| "." "y" "w" |
| | \| "." "x" "y" "w" |
| | \| "." "z" "w" |
| | \| "." "x" "z" "w" |
| | \| "." "y" "z" "w" |
| | \| "." "x" "y" "z" "w" |
| <optionalSign> | ::= "" |
| | \| "−" |
| | \| <vp2-optionalSign> |
| <vp2-optionalSign> | ::= "+" |
| <vp2-instructionLabel> | ::= <vp2-branchLabel> ":" |
| <vp2-branchTable> | ::= "" |
| | \| "JMPTABLE" "{" <vp2-branchList> "}" |
| | \| |
| <vp2-branchList> | ::= "" |
| | \| <vp2-branchLabel> |
| | \| <vp2-branchLabel> "," <vp2-branchList> |
| <vp2-branchLabel> | ::= <identifier> |
| <optionalWriteMask> | ::= "" |
| | \| "." "x" |
| | \| "." "y" |
| | \| "." "x" "y" |
| | \| "." "z" |
| | \| "." "x" "z" |
| | \| "." "y" "z" |
| | \| "." "x" "y" "z" |
| | \| "." "w" |
| | \| "." "x" "w" |
| | \| "." "y" "w" |
| | \| "." "x" "y" "w" |
| | \| "." "z" "w" |
| | \| "." "x" "z" "w" |
| | \| "." "y" "z" "w" |
| | \| "." "x" "y" "z" "w" |
| <optionalCCMask> | ::= "" |
| | \| <vp2-ccMask> |
| <vp2-ccMask> | ::= "(" <vp2-ccMaskRule> <swizzleSuffix> ")" |
| <vp2-ccMaskRule> | ::= "EQ" \| "GE" \| "GT" \| "LE" \| "LT" \| "NE" |
| | \| "TR" \| "FL" |
| <scalarSuffix> | ::= "." <component> |
| <swizzleSuffix> | ::= "" |
| | \| "." <component> |
| | \| "." <component> <component> <component> <component> |
| <component> | ::= "x" |
| | \| "y" |
| | \| "z" |
| | \| "w" |

The <identifier> rule matches a sequence of one or more letters ("A" through "Z", "a" through "z", and "_") and digits ("0" through "9"); the first character may be a letter. The underscore ("_") counts as a letter. Upper and lower case letters are different (names are case-sensitive).

The <vertexAttribRegNum> rule matches both register numbers 0 through 15 and a set of mnemonics that abbreviate the aliasing of conventional per-vertex parameters to vertex attribute register numbers. Table 17 shows the mapping from mnemonic to vertex attribute register number and what the mnemonic abbreviates.

TABLE 17

| Mnemonic | Vertex Attribute Register Number | Meaning |
| --- | --- | --- |
| "OPOS" | 0 | object position |
| "WGHT" | 1 | vertex weight |
| "NRML" | 2 | normal |
| "COL0" | 3 | primary color |
| "COL1" | 4 | secondary color |
| "FOGC" | 5 | fog coordinate |
| "TEX0" | 8 | texture coordinate 0 |
| "TEX1" | 9 | texture coordinate 1 |
| "TEX2" | 10 | texture coordinate 2 |
| "TEX3" | 11 | texture coordinate 3 |
| "TEX4" | 12 | texture coordinate 4 |
| "TEX5" | 13 | texture coordinate 5 |
| "TEX6" | 14 | texture coordinate 6 |
| "TEX7" | 15 | texture coordinate 7 |

Table 17 thus shows the mapping between vertex attribute register numbers, mnemonics, and meanings.

A vertex program fails to load if it does not write at least one component of the HPOS register.

A vertex program fails to load in the VP1 execution environment if it contains more than 128 instructions. A vertex program fails to load in the VP2 execution environment if it contains more than 256 instructions. Each block of text matching the <instruction> rule counts as an instruction.

A vertex program fails to load if any instruction sources more than one unique program parameter register. An instruction can match the <progParamRegister> rule more than once only if all such matches are identical.

A vertex program fails to load if any instruction sources more than one unique vertex attribute register. An instruction can match the <vtxAttribRegister> rule more than once only if all such matches refer to the same register.

The error INVALID_OPERATION is generated if a vertex program fails to load because it is not syntactically correct or for one of the semantic restrictions listed above.

The error INVALID_OPERATION is generated if a program is loaded for id when id is currently loaded with a program of a different target.

A successfully loaded vertex program is parsed into a sequence of instructions. Each instruction is identified by its tokenized name. The operation of these instructions when executed is defined hereinafter.

A successfully loaded program replaces the program previously assigned to the name specified by id. If the OUT_OF_MEMORY error is generated by LoadProgramNV, no change is made to the previous contents of the named program.

Querying the value of PROGRAM_ERROR_POSITION_NV returns a ubyte offset into the last loaded program string indicating where the first error in the program. If the program fails to load because of a semantic restriction that cannot be determined until the program is fully scanned, the error position may be len, the length of the program. If the program loads successfully, the value of PROGRAM_ERROR_POSITION_NV is assigned the value negative one.

Vertex Program Binding and Program Management

The current vertex program is invoked whenever vertex attribute zero is updated (whether by a VertexAttributeNV or Vertex command). The current vertex program is updated by:

BindProgramNV(enum target, uint id);

where target may be VERTEX_PROGRAM_NV.

This binds the vertex program named by id as the current vertex program. The error INVALID_OPERATION is generated if id names a program that is not a vertex program (for example, if id names a vertex state program as described hereinafter).

Binding to a nonexistent program id does not generate an error. In particular, binding to program id zero does not generate an error. However, because program zero cannot be loaded, program zero is always nonexistent. If a program id is successfully loaded with a new vertex program and id is also the currently bound vertex program, the new program is considered the currently bound vertex program. The INVALID_OPERATION error is generated when both vertex program mode is enabled and Begin is called (or when a command that performs an implicit Begin is called) if the current vertex program is nonexistent or not valid. A vertex program may not be valid for reasons explained in a later section.

Programs are deleted by calling:

void DeleteProgramsNV(sizei n, const uint *ids);

ids contains n names of programs to be deleted. After a program is deleted, it becomes nonexistent, and its name is again unused. If a program that is currently bound is deleted, it is as though BindProgramNV has been executed with the same target as the deleted program and program zero. Unused names in ids are silently ignored, as is the value zero.

The command:

void GenProgramsNV(sizei n, uint *ids);

returns n previously unused program names in ids. These names are marked as used, for the purposes of GenProgramsNV only, but they become existent programs only when the are first loaded using LoadProgramNV. The error INVALID_VALUE is generated if n is negative.

An implementation may choose to establish a working set of programs on which binding and ExecuteProgramNV operations (execute programs are explained in a later section) are performed with higher performance. A program that is currently part of this working set is said to be resident.

The command:

boolean AreProgramsResidentNV(sizei n, const uint *ids, boolean *residences);

returns TRUE if all of the n programs named in ids are resident, or if the implementation does not distinguish a working set. If at least one of the programs named in ids is not resident, then FALSE is returned, and the residence of each program is returned in residences. Otherwise the contents of residences are not changed. If any of the names in ids are nonexistent or zero, FALSE is returned, the error INVALID_VALUE is generated, and the contents of residences are indeterminate. The residence status of a single named program can also be queried by calling GetProgramivNV with id set to the name of the program and pname set to PROGRAM_RESIDENT_NV.

AreProgramsResidentNV indicates only whether a program is currently resident, not whether it could not be made resident. An implementation may choose to make a program resident only on first use, for example. The client may guide the GL implementation in determining which programs should be resident by requesting a set of programs to make resident.

The command:

void RequestResidentProgramsNV(sizei n, const uint *ids);

requests that the n programs named in ids should be made resident. While all the programs are not guaranteed to become resident, the implementation should make a best effort to make as many of the programs resident as possible. As a result of making the requested programs resident, program names not among the requested programs may become non-resident. Higher priority for residency should be given to programs listed earlier in the ids array. RequestResidentProgramsNV silently ignores attempts to make resident nonexistent program names or zero. AreProgramsResidentNV can be called after RequestResidentProgramsNV to determine which programs actually became resident.

Vertex Program Operation

In the VP1 execution environment, there are twenty-one vertex program instructions. Four instructions (ABS, DPH, RCC, and SUB) are available only in the VP1.1 execution environment. The instructions and their respective input and output parameters are summarized in Table 18.

TABLE 18

| Instruction | Inputs | Output | Description |
|---|---|---|---|
| ABS(*) | v | v | absolute value |
| ADD | v,v | v | add |
| ARL | v | as | address register load |
| DP3 | v,v | ssss | 3-component dot product |
| DP4 | v,v | ssss | 4-component dot product |
| DPH(*) | v,v | ssss | homogeneous dot product |
| DST | v,v | v | distance vector |
| EXP | s | v | exponential base 2 (approximate) |
| LIT | v | v | compute light coefficients |
| LOG | s | v | logarithm base 2 (approximate) |
| MAD | v,v,v | v | multiply and add |
| MAX | v,v | v | maximum |
| MIN | v,v | v | minimum |
| MOV | v | v | move |
| MUL | v,v | v | multiply |
| RCC(*) | s | ssss | reciprocal (clamped) |
| RCP | s | ssss | reciprocal |
| RSQ | s | ssss | reciprocal square root |
| SGE | v,v | v | set on greater than or equal |
| SLT | v,v | v | set on less than |
| SUB(*) | v,v | v | subtract |

Table 18 thus shows a summary of vertex program instructions in the VP1 execution environment. "v" indicates a floating-point vector input or output, "s" indicates a floating-point scalar input, "ssss" indicates a scalar output replicated across a 4-component vector, "as" indicates a single component of an address register.

In the VP2 execution environment, there are thirty-nine vertex program instructions. Vertex program instructions may have an optional suffix of "C" to allow an update of the condition code register.

For example, there are two instructions to perform vector addition, "ADD" and "ADDC". The vertex program instructions available in the VP2 execution environment and their respective input and output parameters are summarized in Table 19.

TABLE 19

| Instruction | Inputs | Output | Description |
|---|---|---|---|
| ABS[C] | v | v | absolute value |
| ADD[C] | v,v | v | add |
| ARA[C] | av | av | address register add |
| ARL[C] | v | av | address register load |
| ARR[C] | v | av | address register load (w/ round) |
| BRA | as | none | branch |
| CAL | as | none | subroutine call |
| COS[C] | s | ssss | cosine |
| DP3[C] | v,v | ssss | 3-component dot product |
| DP4[C] | v,v | ssss | 4-component dot product |
| DPH[C] | v,v | ssss | homogeneous dot product |
| DST[C] | v,v | v | distance vector |
| EX2[C] | s | ssss | exponential base 2 |
| EXP[C] | s | v | exponential base 2 (approximate) |
| FLR[C] | v | v | floor |
| FRC[C] | v | v | fraction |
| LG2[C] | s | ssss | logarithm base 2 |
| LIT[C] | v | v | compute light coefficients |
| LOG[C] | s | v | logarithm base 2 (approximate) |
| MAD[C] | v,v,v | v | multiply and add |
| MAX[C] | v,v | v | maximum |
| MIN[C] | v,v | v | minimum |
| MOV[C] | v | v | move |
| MUL[C] | v,v | v | multiply |
| RCC[C] | s | ssss | reciprocal (clamped) |
| RCP[C] | s | ssss | reciprocal |
| RET | none | none | subroutine call return |
| RSQ[C] | s | ssss | reciprocal square root |
| SEQ[C] | v,v | v | set on equal |
| SFL[C] | v,v | v | set on false |
| SGE[C] | v,v | v | set on greater than or equal |
| SGT[C] | v,v | v | set on greater than |
| SIN[C] | s | ssss | sine |
| SLE[C] | v,v | v | set on less than or equal |
| SLT[C] | v,v | v | set on less than |
| SNE[C] | v,v | v | set on not equal |
| SSG[C] | v | v | set sign |
| STR[C] | v,v | v | set on true |
| SUB[C] | v,v | v | subtract |

Table 19 thus shows a summary of vertex program instructions in the VP2 execution environment. "v" indicates a floating-point vector input or output, "s" indicates a floating-point scalar input, "ssss" indicates a scalar output replicated across a 4-component vector, "av" indicates a full address register, "as" indicates a single component of an address register.

Vertex Program Operands

Most vertex program instructions operate on floating-point vectors, floating-point scalars, or integer scalars as, indicated in the grammar by the rules <vectorSrc>, <scalarSrc>, and <scalarAddr>, respectively. See Table 16.

The basic set of floating-point scalar operands is defined by the grammar rule <baseScalarSrc>. Scalar operands are single components of vertex attribute, program parameter, or temporary registers, as allowed by the <srcRegister> rule. A vector component is selected by the <scalarSuffix> rule, where the characters "x", "y", "z", and "w" select the x, y, z, and w components, respectively, of the vector.

The basic set of floating-point vector operands is defined by the grammar rule <baseVectorSrc>. Vector operands can be obtained from vertex attribute, program parameter, or temporary registers as allowed by the <srcRegister> rule.

Basic vector operands can be swizzled according to the <swizzleSuffix> rule. In its most general form, the <swizzleSuffix> rule matches the pattern ".????" where each question mark is replaced with one of "x", "y", "z", or "w". For such patterns, the x, y, z, and w components of the operand are taken from the vector components named by the first, second, third, and fourth character of the pattern, respectively. For example, if the swizzle suffix is ".yzzx" and the specified source contains {2,8,9,0}, the swizzled operand used by the instruction is {8,9,9,2}.

If the <swizzleSuffix> rule matches " " (empty string), it is treated as though it were ".xyzw". If the <swizzleSuffix> rule matches (ignoring whitespace) ".x", ".y", ".z", or ".w", these are treated the same as ".xxxx", ".yyyy", ".zzzz", and ".wwww" respectively.

Floating-point scalar or vector operands can optionally be negated according to the <negate> rules in <baseScalarSrc> and <baseVectorSrc>. If the <negate> matches "–", each operand or operand component is negated.

In the VP2 execution environment, a component-wise absolute value operation is performed on an operand if the <scalarSrc> or <vectorSrc> rules match <vp2–absScalarSrc> or <vp2–absVectorSrc>. In this case, the absolute value of each component of the operand is taken. In addition, if the <negate> rule in <vp2–absScalarSrc> or <vp2–absVectorSrc> matches "–", each component is subsequently negated.

Integer scalar operands are single components of one of the address register vectors, as identified by the <addrRegister> rule. A vector component is selected by the <scalarSuffix> rule in the same manner as floating-point scalar operands. Negation and absolute value operations are not available for integer scalar operands.

The following pseudo-code spells out the operand generation process. In the pseudo-code, "float" and "int" are floating-point and integer scalar types, while "floatVec" and "intVec" are four-component vectors. "source" is the register used for the operand, matching the <srcRegister> or <addrRegister> rules. "absolute" is TRUE if the operand matches the <vp2–absScalarSrc> or <vp2–absVectorSrc> rules, and FALSE otherwise. "negateBase" is TRUE if the <negate> rule in <baseScalarSrc> or <baseVectorSrc> matches "–" and FALSE otherwise. "negateAbs" is TRUE if the <negate> rule in <vp2–absScalarSrc> or <vp2–absVectorSrc> matches "–" and FALSE otherwise. The ".c***", ".*c", ".c*", ".***c" modifiers refer to the x, y, z, and w components obtained by the swizzle operation. See, for example, Table 20.

TABLE 20

```
floatVec VectorLoad(floatVec source)
{
    floatVec operand;
    operand.x = source.c***;
    operand.y = source.*c**;
    operand.z = source.**c*;
    operand.w = source.***c;
    if (negateBase) {
        operand.x = -operand.x;
        operand.y = -operand.y;
        operand.z = -operand.z;
        operand.w = -operand.w;
    }
    if (absolute) {
        operand.x = abs (operand.x);
        operand.y = abs (operand.y);
        operand.z = abs (operand.z);
        operand.w = abs (operand.w);
    }
    if (negateAbs) {
        operand.x = -operand.x;
        operand.y = -operand.y;
        operand.z = -operand.z;
        operand.w = -operand.w;
    }
    return operand;
}
```

TABLE 20-continued

```
float ScalarLoad(floatVec source)
{
    float operand;
    operand = source.c***;
    if (negateBase) {
        operand = -operand;
    }
    if (absolute) {
        operand = abs (operand);
    }
    if (negateAbs) {
        operand = -operand;
    }
    return operand;
}
intVec AddrVectorLoad (intVec addrReg)
{
    intVec operand;
    operand.x = source.c***;
    operand.y = source.*c**;
    operand.z = source.**c*;
    operand.w = source.***c;
    return operand;
}
int AddrScalarLoad(intVec addrReg)
{
    return source.c***;
}
```

If an operand is obtained from a program parameter register, by matching the <progParamRegister> rule, the register number can be obtained by absolute or relative addressing.

When absolute addressing is used, by matching the <absProgParamReg> rule, the program parameter register number is the number matching the <progParamRegNum>.

When relative addressing is used, by matching the <relProgParamReg> rule, the program parameter register number is computed during program execution. An index is computed by adding the integer scalar operand specified by the <scalarAddr> rule to the positive or negative offset specified by the <progParamOffset> rule. If <progParamOffset> matches " ", an offset of zero is used.

The following pseudo-code of Table 21 spells out the process of loading a program parameter. "addrReg" refers to the address register used for relative addressing, "absolute" is TRUE if the operand uses absolute addressing and FALSE otherwise. "paramNumber" is the program parameter number for absolute addressing; "paramOffset" is the program parameter offset for relative addressing. "paramRegiser" is an array holding the complete set of program parameter registers.

TABLE 21

```
floatVec ProgramParameterLoad (intVec addrReg)
{
    int index;
    if (absolute) {
        index = paramNumber;
    } else {
        index = AddrScalarLoad(addrReg) + paramOffset
    }
    return paramRegister[index];
}
```

Vertex Program Destination Register Update

Most vertex program instructions write a 4-component result vector to a single temporary, vertex result, or address register. Writes to individual components of the destination register are controlled by individual component write masks specified as part of the instruction. In the VP2 execution environment, writes are additionally controlled by the a condition code write mask, which is computed at run time.

The component write mask is specified by the <optionalWriteMask> rule found in the <maskedDstReg> or <maskedAddrReg> rule. If the optional mask is " ", all components are enabled. Otherwise, the optional mask names the individual components to enable. The characters "x", "y", "z", and "w" match the x, y, z, and w components respectively. For example, an optional mask of ".xzw" indicates that the x, z, and w components should be enabled for writing but the y component should not. The grammar requires that the destination register mask components may be listed in "xyzw" order.

In the VP2 execution environment, the condition code write mask is specified by the <optionalCCMask> rule found in the <maskedDstReg> and <maskedAddrReg> rules. If the condition code mask matches " ", all components are enabled. Otherwise, the condition code register is loaded and swizzled according to the swizzle codes specified by <swizzleSuffix>. Each component of the swizzled condition code is tested according to the rule given by <ccMaskRule>. <ccMaskRule> may have the values "EQ", "NE", "LT", "GE", LE", "GT" which mean to enable writes if the corresponding condition code field evaluates to equal, not equal, less than, greater than or equal, less than or equal, or greater than, respectively. Comparisons involving condition codes of "UN" (unordered) always evaluate to false. In addition, "TR" always enables writes and "FL" always disables writes. For example, if the condition code is (GT,LT,EQ,GT) and the condition code mask is "(NE.zyxw)", the swizzle operation may load (EQ,LT,GT,GT) and the mask may thus enable writes on only the y, z, and w components. Writes to the x component may be disabled in this case.

Each component of the destination register is updated with the result of the vertex program instruction if and only if the component is enabled for writes by the component write mask, and the optional condition code mask (if applicable). Otherwise, the component of the destination register remains unchanged.

In the VP2 execution environment, a vertex program instruction can also optionally update the condition code register. The condition code is updated if the condition code register update suffix "C" is present in the instruction. The instruction "ADDC" may update the condition code; the otherwise equivalent instruction "ADD" may not. If condition code updates are enabled, each component of the destination register enabled for writes is compared to zero. The corresponding component of the condition code is set to "LT", "EQ", or "GT", if the written component is less than, equal to, or greater than zero, respectively. Condition code components are set to "UN" if the written component is NaN. Note that valuesValues of −0.0 and +0.0 both evaluate to "EQ". If a component of the destination register is not enabled for writes, the corresponding condition code component is also unchanged.

Table 21A illustrates exemplary code.

TABLE 21A

```
# R1=(−2, 0, 2, NaN)
MOVC R0, R1;
MOVC R0.xyz, R1.yzwx;
MOVC R0 (NE), R1.zywx;
```

The first instruction writes (−2,0,2,NaN) to R0 and updates the condition code to (LT,EQ,GT,UN). The second instruction, writes to the "w" component of R0 and the condition code are disabled, so R0 ends up with (0,2,NaN,NaN) and the condition code ends up with (EQ,GT,UN,UN). In the third instruction, the condition code mask disables writes to the x component (its condition code field is "EQ"), so R0 ends up with (0,NaN,−2,0) and the condition code ends up with (EQ, UN,LT,EQ).

The following pseudocode illustrates the process of writing a result vector to the destination register. In the pseudocode, "instrmask" refers to the component write mask given by the <optionalWriteMask> rule. In the VP1 execution environment, "ccMaskRule" is always " " and "updatecc" is always FALSE. In the VP2 execution environment, "ccMaskRule" refers to the condition code mask rule given by <vp2-optionalCCMask> and "updatecc" is TRUE if and only if condition code updates are enabled. "result", "destination", and "cc" refer to the result vector, the register selected by <dstRegister> and the condition code, respectively. Condition codes do not exist in the VP1 execution environment. See Table 22.

TABLE 22

```
boolean TestCC(CondCode field) {
        switch (ccMaskRule) {
        case "EQ":   return (field == "EQ");
        case "NE":   return (field == "LT" || field == "GT");
        case "LT":   return (field == "LT");
        case "GE":   return (field == "GT" || field == "EQ");
        case "LE":   return (field == "LT" || field == "EQ");
        case "GT":   return (field == "GT");
        case "TR":   return TRUE;
        case "FL":   return FALSE;
        case "":     return TRUE;
        }
}
enum GenerateCC(float value) {
    if (value == NaN) {
        return UN;
    } else if (value < 0) {
        return LT;
    } else if (value == 0) {
        return EQ;
    } else {
        return GT;
    }
}
void UpdateDestination(floatVec destination, floatVec result)
{
        floatVec    merged;
        ccVec       mergedCC;
        // Merge the converted result into the destination register, under
        // control of the compile- and run-time write masks.
        merged = destination;
        mergedCC = cc;
        if (instrMask.x && TestCC(cc.c***)) {
            merged.x = result.x;
            if (updatecc) mergedCC.x = GenerateCC(result.x);
        }
        if (instrMask.y && TestCC(cc.*c**)) {
            merged.y = result.y;
            if (updatecc) mergedCC.y = GenerateCC(result.y);
        }
        if (instrMask.z && TestCC(cc.**c*)) {
            merged.z = result.z;
            if (updacecc) mergedCC.z = GenerateCC(result.z);
        }
        if (instrMask.w && TestCC(cc.***c)) {
            merged.w = result.w;
            if (updatecc) mergedCC.w = GenerateCC(result.w);
        }
        // Write out the new destination register and condition code.
        destination = merged;
        cc = mergedCC;
}
```

Vertex Program Execution

In the VP1 execution environment, vertex programs consist of a sequence of instructions without no support for branching. Vertex programs begin by executing the first instruction in the program, and execute instructions in the order specified in the program until the last instruction is reached.

VP2 vertex programs can contain one or more instruction labels, matching the grammar rule <vp2-instructionLabel>. An instruction label can be referred to explicitly in branch (BRA) or subroutine call (CAL) instructions, or can be found in the branch table, as described below. Instruction labels can be defined or used at any point in the body of a program, and can be used in instructions or branch table entries before being defined in the program string.

VP2 vertex programs can contain a branch table, as specified in the grammar rule <vp2-branchTable>. The branch table is a list of up to 16 instruction labels. The first entry in the branch table is assigned an index of zero, and subsequent labels are assigned sequentially increasing indices. When an branch instruction refers to the branch table (by matching the <vp2-indexedBranch> rule), the contents of an address register are added to a constant offset, and clamped to the range [0,N], where N is the index of the last entry of the branch table, to obtain a branch table index. Vertex program execution will continue with the instruction corresponding to the branch table entry matching the computed index.

VP2 vertex program branching instructions can be conditional. The branch condition is specified by the <vp2-conditionMask> and may depend on the contents of the condition code register. Branch conditions are evaluated by evaluating a condition code write mask in exactly the same manner as done for register writes. If any of the four components of the condition code write mask are enabled, the branch is taken and execution continues with the instruction following the label specified in the instruction or the branch table. Otherwise, the instruction is ignored and vertex program execution continues with the next instruction.

Table 23A illustrates exemplary code.

TABLE 23A

| | |
|---|---|
| MOVO CC, c[0]; | # c[0]=(−2, 0, 2, NaN), CC gets |
| (LT, EQ, GT, UN) | |
| BRA label1 (LT.xyzw); | |
| MOV R0,R1; | # not executed |
| label1: | |
| BRA label2 (LT.wyzw); | |
| MOV R0,R2; | # executed |
| label2: | |

The first BRA instruction loads a condition code of (LT, EQ,GT,UN) while the second BRA instruction loads a condition code of (UN,EQ,GT,UN). The first branch will be taken because the "x" component evaluates to LT; the second branch will not be taken because no component evaluates to LT.

VP2 vertex programs can specify subroutine calls. When a subroutine call (CAL) instruction is executed, a reference to the instruction immediately following the CAL instruction is pushed onto the call stack. When a subroutine return (RET) instruction is executed, an instruction reference is popped off the call stack and program execution continues with the popped instruction. A vertex program may terminate if a CAL instruction is executed with four entries already in the call stack or if a RET instruction is executed with an empty call stack.

If a VP2 vertex program has an instruction label "main", program execution begins with the instruction immediately following the instruction label. Otherwise, program execution begins with the first instruction of the program. Instructions may be executed sequentially in the order specified in the program, although branch instructions may affect the instruction execution order, as described above. A vertex program may terminate after executing a RET instruction with an empty call stack. A vertex program may also terminate after executing the last instruction in the program, unless that instruction was an executed branch.

A vertex program may fail to load if an instruction or branch table entry refers to a label that is not defined in the program string.

A vertex program may terminate abnormally if it executes a branch instruction that computes a branch table index that does not identify a valid entry in the branch table, except if the branch instruction is conditional and the condition evaluates to FALSE. A vertex program may terminate abnormally if a subroutine call instruction produces a call stack overflow. Additionally, a vertex program may terminate abnormally after executing 65536 instructions to prevent hangs caused by infinite loops in the program.

When a vertex program terminates, normally or abnormally, it may emit a vertex whose attributes are taken from the final values of the vertex result registers.

Vertex Program Instruction Set

The following sections describe the set of supported vertex program instructions. Instructions available only in the VP1.1 or VP2 execution environment may be noted in the instruction description.

Each section may contain pseudocode describing the instruction. Instructions may have up to three operands, referred to as "op0", "op1", and "op2". The operands are loaded using the mechanisms specified herein. Most instructions may generate a result vector called "result". The result vector is then written to the destination register specified in the instruction using the mechanisms specified herein.

Operands and results are represented as 32-bit single-precision floating-point numbers according to the IEEE 754 floating-point specification. IEEE denorm encodings, used to represent numbers smaller than $2^{-126}$, are not supported. All such numbers are flushed to zero. There are three special encodings referred to in this section: +INF means "positive infinity", −INF means "negative infinity", and NaN refers to "not a number".

Arithmetic operations are typically carried out in single precision according to the rules specified in the IEEE 754 specification. Any exceptions and special cases may be noted in the instruction description.

ABS: Absolute Value

The ABS instruction performs a component-wise absolute value operation on the single operand to yield a result vector. See Table 23A-1.

TABLE 23A-1

```
tmp = VectorLoad(op0);
result.x = abs(tmp.x);
result.y = abs(tmp.y);
result.z = abs(tmp.z);
result.w = abs(tmp.w);
```

The following special-case rules apply to absolute value operations:
1. abs(NaN)=NaN.
2. abs(−INF)=abs(+INF)=+INF.
3. abs(−0.0)=abs(+0.0)=+0.0.

The ABS instruction is available only in the VP1.1 and VP2 execution environments.

In the VP1.0 execution environment, the same functionality can be achieved with "MAX result, src, –src". In the VP2 execution environment, the ABS instruction is effectively obsolete, since instructions can take the absolute value of each operand at no cost.

ADD: Add

The ADD instruction performs a component-wise add of the two operands to yield a result vector. See Table 23B.

TABLE 23B tmp0 = VectorLoad(op0);
tmp1 = VectorLoad(op1)
result.x = tmp0.x + tmp1.x;
result.y = tmp0.y + tmp1.y;
result.z = tmp0.z + tmp1.z;
result.w = tmp0.w + tmp1.w;

The following special-case rules apply to addition:
1. "A+B" is always equivalent to "B+A".
2. NaN+<x>=NaN, for all <x>.
3. +INF+<x>=+INF, for all <x> except NaN and –INF.
4. –INF+<x>=–INF, for all <x> except NaN and +INF.
5. +INF+–INF=NaN.
6. –0.0+<x>=<x>, for all <x>.
7. +0.0+<x>=<x>, for all <x> except –0.0.

ARA: Address Register Add

The ARA instruction adds two pairs of components of a vector address register operand to produce an integer result vector. The "x" and "z" components of the result vector contain the sum of the "x" and "z" components of the operand; the "y" and "w" components of the result vector contain the sum of the "y" and "w" components of the operand. Each component of the result vector is clamped to [–512, +511], the range of representable address register components. See Table 23C.

TABLE 23C itmp = AddrVectorLoad(op0);
iresult.x = itmp.x + itmp.z;
iresult.y = itmp.y + itmp.w;
iresult.z = itmp.x + itmp.z;
iresult.w = itmp.y + itmp.w;
if (iresult.x < –512) iresult.x = –512;
if (iresult.x > 511) iresult.x = 511;
if (iresult.y < –512) iresult.y = –512;
if (iresult.y > 511) iresult.y = 511;
if (iresult.z < –512) iresult.z = –512;
if (iresult.z > 511) iresult.z = 511;
if (iresult.w < –512) iresult.w = –512;
if (iresult.w > 511) iresult.w = 511;

Component swizzling is not supported when the operand is loaded.

The ARA instruction is available only in the VP2 execution environment.

The ARA instruction is available only in the VP2 execution environment.

ARL: Address Register Load

In the VP1 execution environment, the ARL instruction loads a single scalar operand and performs a floor operation to generate an integer scalar to be written to the address register. See Table 23D.

TABLE 23D tmp = ScalarLoad(op0);
iresult.x = floor(tmp);

In the VP2 execution environment, the ARL instruction loads a single vector operand and performs a component-wise floor operation to generate an integer result vector. Each component of the result vector is clamped to [–512, +511], the range of representable address register components. See Table 23E. The ARL instruction applies all masking operations to address register writes as are described earlier.

TABLE 23E tmp = VectorLoad(op0);
iresult.x = floor(tmp.x);
iresult.y = floor(tmp.y);
iresult.z = floor(tmp.z);
iresult.w = floor(tmp.w)
if (iresult.x < –512) iresult.x = –512;
if (iresult.x > 511) iresult.x = 511;
if (iresult.y < –512) iresult.y = –512;
if (iresult.y > 511) iresult.y = 511;
if (iresult.z < –512) iresult.z = –512;
if (iresult.z > 511) iresult.z = 511;
if (iresult.w < –512) iresult.w = –512;
if (iresult.w > 511) iresult.w = 511;

The following special-case rules apply to floor computation:
1. floor(NaN)=NaN.
2. floor(<x>)=<x>, for –0.0, +0.0, –INF, and +INF. In all cases, the sign of the result is equal to the sign of the operand.

ARR: Address Register Load (with Round)

The ARR instruction loads a single vector operand and performs a component-wise round operation to generate an integer result vector. Each component of the result vector is clamped to [–512, +511], the range of representable address register components. The ARR instruction applies all masking operations to address register writes as described herein. See Table 23F.

TABLE 23F tmp = VectorLoad(op0);
iresult.x = round(tmp.x);
iresult.y = round(tmp.y);
iresult.z = round(tmp.z);
iresult.w = round(tmp.w);
if (iresult.x < –512) iresult.x = –512;
if (iresult.x > 511) iresult.x = 511;
if (iresult.y < –512) iresult.y = –512;
if (iresult.y > 511) iresult.y = 511;
if (iresult.z < –512) iresult.z = –512;
if (iresult.z > 511) iresult.z = 511;
if (iresult.w < –512) iresult.w = –512;
if (iresult.w > 511) iresult.w = 511;

The rounding function, round(x), returns the nearest integer to <x>. If the fractional portion of <x> is 0.5, round(x) selects the nearest even integer.

The ARR instruction is available only in the VP2 execution environment.

BRA: Branch

The BRA instruction conditionally transfers control to the instruction following the label specified in the instruction or at a computed offset in the branch table. The following pseudocode describes the operation of the instruction. See Table 23G.

TABLE 23G

```
if (TestCC(cc.c***) || TestCC(cc.*c**) ||
        TestCC(cc.**c*) || TestCC(cc.***c)) {
    if (branchUsesTable) {
        index = ScalarLoad(addrReg) + branchTableOffset;
        if (index < 0 ||) {
            index = 0;
        } else if (index >= branchTableSize) {
            // terminate vertex program
            index = branchTableSize – 1;
        }
        label = branchTable[index];
    } else {
        label = branchLabel;
    }
    // Continue execution at instruction following label
} else {
    // do nothing
}
```

In the pseudocode, <branchUsesTable> is true if the instruction matches the <vp2–indexedBranch> grammar rule, <branchTableOffset> is the base offset into the branch table specified by <vp2–indexedBrOffset>, <branchTableSize> is the number of entries in the branch table, <branchTable> is an array holding the branch table, and <branchLabel> is the label specified in the instruction matching the <vp2–branchLabel> grammar rule.

The BRA instruction is available only in the VP2 execution environment.

CAL: Subroutine Call

The CAL instruction conditionally transfers control to the instruction following the label specified in the instruction or at a computed offset in the branch table. It also pushes a reference to the instruction immediately following the CAL instruction onto the call stack, where execution will continue after executing the matching RET instruction. The following pseudocode describes the operation of the instruction. See Table 23H.

TABLE 23H

```
if (TestCC(cc.c***) || TestCC(cc.*c**) ||
        TestCC(cc.**c*) || TestCC(cc.***c)) {
    if (branchUsesTable) {
        index = ScalarLoad(addrReg) + branchTableOffset;
        if (index < 0) {
            index = 0;
        } else if (index >= branchTableSize) {
            index = branchTableSize – 1;
        }
        label = branchTable(index);
    } else {
        label = branchLabel;
    }
    if (callStackDepth >= 4) {
        // terminate vertex program
    } else {
        callStack[callStackDepth] = nextInstruction;
        callStackDepth++;
    }
    // continue execution at instruction following label
} else {
    // do nothing
}
```

In the pseudocode, <branchUsesTable> is true if the instruction matches the <vp2–indexedBranch> grammar rule, <branchTableOffset> is the base offset into the branch table specified by <vp2–indexedBrOffset>, <branchTableSize> is the number of entries in the branch table, <branchTable> is an array holding the branch table, <branchLabel> is the label specified in the instruction matching the <vp2–branchLabel> grammar rule, <callStackDepth> is the depth of the call stack, <callStack> is an array holding the call stack, and <nextInstruction> is a reference to the instruction immediately following the present one in the program string. The CAL instruction is available only in the VP2 execution environment.

COS: Cosine

The COS instruction approximates the cosine of the angle specified by the scalar operand and replicates the approximation to all four components of the result vector. The angle is specified in radians and does not have to be in the range [0,2*PI]. See Table 23I.

TABLE 23I

```
tmp = ScalarLoad(op0);
result.x = ApproxCosine(tmp);
result.y = ApproxCosine(tmp);
result.z = ApproxCosine(tmp);
result.w = ApproxCosine(tmp);
```

The approximation function ApproxCosine is accurate to at least 22 bits with an angle in the range [0,2*PI]. See Table 23I-1.

TABLE 23I-1

| ApproxCosine(x) – cos(x) | < 1.0 / 2^22, if 0.0 <= x < 2.0 * PI.

The error in the approximation may typically increase with the absolute value of the angle when the angle falls outside the range [0,2*PI].

The following special-case rules apply to cosine approximation:

1. ApproxCosine(NaN)=NaN.
2. ApproxCosine(+/–INF)=NaN.
3. ApproxCosine(+/–0.0)=+1.0.

The COS instruction is available only in the VP2 execution environment.

DP3: 3-Component Dot Product

The DP3 instruction computes a three component dot product of the two operands (using the x, y, and z components) and replicates the dot product to all four components of the result vector. See Table 23J.

TABLE 23J

```
tmp0 = VectorLoad(op0);
tmp1 = VectorLoad(op1);
result.x =  (tmp0.x * tmp1.x) + (tmp0.y * tmp1.y) +
            (tmp0.z * tmp1.z);
result.y =  (tmp0.x * tmp1.x) + (tmp0.y * tmp1.y) +
            (tmp0.z * tmp1.z);
result.z =  (tmp0.x * tmp1.x) + (tmp0.y * tmp1.y) +
            (tmp0.z * tmp1.z);
result.w =  (tmp0.x * tmp1.x) + (tmp0.y * tmp1.y) +
            (tmp0.z tmp1.z);
```

DP4: 4-Component Dot Product

The DP4 instruction computes a four component dot product of the two operands and replicates the dot product to all four components of the result vector. See Table 23K.

TABLE 23K

```
tmp0 = VectorLoad(op0);
tmp1 = VectorLoad(op1):
result.x =   (tmp0.x * tmp1.x) + (tmp0.y * tmp1.y) +
             (tmp0.z * tmp1.z) + (tmp0.w * tmp1.w);
result.y =   (tmp0.x * tmp1.x) + (tmp0.y * tmp1.y) +
             (tmp0.z * tmp1.z) + (tmp0.w * tmp1.w);
result.z =   (tmp0.x * tmp1.x) + (tmp0.y * tmp1.y) +
             (tmp0.z * tmp1.z) + (tmp0.w * tmp1.w);
result.w =   (tmp0.x * tmp1.x) + (tmp0.y * tmp1.y) +
             (tmp0.z * tmp1.z) + (tmp0.w * tmp1.w);
```

DPH: Homogeneous Dot Product

The DPH instruction computes a four-component dot product of the two operands, except that the W component of the first operand is assumed to be 1.0. The instruction replicates the dot product to all four components of the result vector. See Table 23L.

TABLE 23L

```
tmp0 = VectorLoad(op0);
tmp1 = VectorLoad(op1):
result.x =   (tmp0.x * tmp1.x) + (tmp0.y * tmp1.y) +
             (tmp0.z * tmp1.z) + tmp1.w;
result.y =   (tmp0.x * tmp1.x) + (tmp0.y * tmp1.y) +
             (tmp0.z * tmp1.z) + tmp1.w;
result.z =   (tmp0.x * tmp1.x) + (tmp0.y * tmp1.y) +
             (tmp0.z * tmp1.z) + tmp1.w;
result.w =   (tmp0.x * tmp1.x) + (tmp0.y * tmp1.y) +
             (tmp0.z * tmp1.z) + tmp1.w;
```

The DPH instruction is available only in the VP1.1 and VP2 execution environments.

DST: Distance Vector

The DST instruction computes a distance vector from two specially-formatted operands. The first operand should be of the form [NA, $d^2$, $d^2$, NA] and the second operand should be of the form [NA, 1/d, NA, 1/d], where NA values are not relevant to the calculation and d is a vector length. If both vectors satisfy these conditions, the result vector may be of the form [1.0, d, $d^2$, 1/d].

The exact behavior is specified in the following pseudo-code. See Table 23M.

TABLE 23M

```
tmp0 = VectorLoad(op0);
tmp1 = VectorLoad(op1);
result.x = 1.0;
result.y = tmp0.y * tmp1.y;
result.z = tmp0.z;
result.w = tmp1.w;
```

Given an arbitrary vector, $d^2$ can be obtained using the DP3 instruction (using the same vector for both operands) and 1/d can be obtained from $d^2$ using the RSQ instruction.

This distance vector is useful for per-vertex light attenuation calculations: a DP3 operation using the distance vector and an attenuation constants vector as operands may yield the attenuation factor.

EX2: Exponential Base 2

The EX2 instruction approximates 2 raised to the power of the scalar operand and replicates it to all four components of the result vector. See Table 23N.

TABLE 23N

```
tmp = ScalarLoad(op0);
result.x = Approx2ToX(tmp);
result.y = Approx2ToX(tmp);
result.z = Approx2ToX(tmp);
result.w = Approx2ToX(tmp);
```

The approximation function is accurate to at least 22 bits. See Table 23N-1.

TABLE 23N-1

| Approx2ToX(x) − $2^x$ | < $1.0 / 2^{22}$, if $0.0 <= x < 1.0$,
and, in general,
    | Approx2ToX(x) − $2^x$ | < $(1.0 / 2^{22}) * (2^{floor(x)})$.

The following special-case rules apply to logarithm approximation:
1. Approx2ToX(NaN)=NaN.
2. Approx2ToX(−INF)=+0.0.
3. Approx2ToX(+INF)=+INF.
4. Approx2ToX(+/−0.0)=+1.0.

The EX2 instruction is available only in the VP2 execution environment.

EXP: Exponential Base 2 (Approximate)

The EXP instruction computes a rough approximation of 2 raised to the power of the scalar operand. The approximation is returned in the "z" component of the result vector. A vertex program can also use the "x" and "y" components of the result vector to generate a more accurate approximation by evaluating the following shown in Table 23O.

TABLE 23O result.x * f(result.y), where f(x) is a user-defined function that approximates $2^x$ over the domain [0.0, 1.0). The "w" component of the result vector is always 1.0.

The exact behavior is specified in the following pseudo-code. See Table 23O-1.

TABLE 23O-1

```
tmp = ScalarLoad(op0);
result.x = 2^floor(tmp);
result.y = tmp − floor(tmp);
result.z = RoughApprox2ToX(tmp);
result.w = 1.0;
```

The approximation function is accurate to at least 11 bits. See Table 23O-2.

TABLE 23O-2

| RoughApprox2ToX(x) − $2^x$ | < $1.0 / 2^{11}$, if $0.0 <= x < 1.0$,
and, in general,
    | RoughApprox2ToX(x) − $2^x$ | < $(1.0 / 2^{11}) * (2^{floor(x)})$.

The following special cases apply to the EXP instruction:
1. RoughApprox2ToX(NaN)=NaN.
2. RoughApprox2ToX(−INF)=+0.0.
3. RoughApprox2ToX(+INF)=+INF.
4. RoughApprox2ToX(+/−0.0)=+1.0.

The EXP instruction is present for compatibility with the original NV_vertex_program instruction set; it is recommended that applications using NV_vertex_program2 use the EX2 instruction instead.

FLR: Floor

The FLR instruction performs a component-wise floor operation on the operand to generate a result vector. The floor of a value is defined as the largest integer less than or equal to the value. The floor of 2.3 is 2.0; the floor of −3.6 is −4.0. See Table 23P.

TABLE 23P

```
tmp = VectorLoad(op0);
result.x = floor(tmp.x);
result.y = floor(tmp.y);
result.z = floor(tmp.z);
result.w = floor(tmp.w);
```

The following special-case rules apply to floor computation:
1. floor(NaN)=NaN.
2. floor(<x>)=<x>, for −0.0, +0.0, −INF, and +INF. In all cases, the sign of the result is equal to the sign of the operand.

The FLR instruction is available only in the VP2 execution environment.

FRC: Fraction

The FRC instruction extracts the fractional portion of each component of the operand to generate a result vector. The fractional portion of a component is defined as the result after subtracting off the floor of the component (see FLR), and is always in the range [0.00, 1.00).

For negative values, the fractional portion is NOT the number written to the right of the decimal point—the fractional portion of −1.7 is not 0.7—it is 0.3. 0.3 is produced by subtracting the floor of −1.7 (−2.0) from −1.7. See Table 23Q.

TABLE 23Q

```
tmp = VectorLoad(op0);
result.x = tmp.x − floor(tmp.x);
result.y = tmp.y − floor(tmp.y);
result.z = tmp.z − floor(tmp.z);
result.w = tmp.w − floor(tmp.w);
```

The following special-case rules, which can be derived from the rules for FLR and ADD apply to fraction computation:
1. fraction(NaN)=NaN.
2. fraction(+/−INF)=NaN.
3. fraction(+/−0.0)=+0.0.

The FRC instruction is available only in the VP2 execution environment.

LG2: Logarithm Base 2

The LG2 instruction approximates the base 2 logarithm of the scalar operand and replicates it to all four components of the result vector. See Table 23R.

TABLE 23R

```
tmp = ScalarLoad(op0);
tmp = abs(tmp);
result.x = ApproxLog2(tmp);
result.y = ApproxLog2(tmp);
result.z = ApproxLog2(tmp);
result.w = ApproxLog2(tmp);
```

The approximation function is accurate to at least 22 bits. See Table 23R-1.

TABLE 23R-1

| ApproxLog2(x) − log_2(x) | < $1.0 / 2^{22}$.

The following special-case rules apply to logarithm approximation:
1. ApproxLog2(NaN)=NaN.
2. ApproxLog2(+INF)=+INF.
3. ApproxLog2(+/−0.0)=−INF.
4. ApproxLog2(x)=NaN, −INF<x<−0.0.
5. ApproxLog2(−INF)=NaN.

The LG2 instruction is available only in the VP2 execution environment.

LIT: Compute Light Coefficients

The LIT instruction accelerates per-vertex lighting by computing lighting coefficients for ambient, diffuse, and specular light contributions. The "x" component of the operand is assumed to hold a diffuse dot product (n dot VP_pli, as in the vertex lighting equations, see for example section 2.13.1 in the OpenGL® specification 1.3). The "y" component of the operand is assumed to hold a specular dot product (n dot h_i). The "w" component of the operand is assumed to hold the specular exponent of the material (s_rm), and is clamped to the range (−128, +128) exclusive.

The "x" component of the result vector receives the value that should be multiplied by the ambient light/material product (always 1.0). The "y" component of the result vector receives the value that should be multiplied by the diffuse light/material product (n dot VP_pli). The "z" component of the result vector receives the value that should be multiplied by the specular light/material product (f_i*(n dot h_i)^s_rm). The "w" component of the result is the constant 1.0.

Negative diffuse and specular dot products are clamped to 0.0, as is done in the standard per-vertex lighting operations. In addition, if the diffuse dot product is zero or negative, the specular coefficient is forced to zero. See Table 23S.

TABLE 23S

```
tmp = VectorLoad(op0);
if (t.x < 0) t.x = 0;
if (t.y < 0) t.y = 0;
if (t.w < −(128.0-epsilon)) t.w = −(128.0-epsilon);
else if (t.w >128-epsilon) t.w = 128-epsilon;
result.x = 1.0;
result.y = t.x;
result.z = (t.x > 0) ? RoughApproxPower(t.y, t.w) : 0.0;
result.w = 1.0;
```

The exponentiation approximation function is defined in terms of the base 2 exponentiation and logarithm approximation operations in the EXP and LOG instructions, including errors and the processing of any special cases. In particular, see Table 23S-1.

TABLE 23S-1

RoughApproxPower(a,b) = RoughApproxExp2(b * RoughApproxLog2(a)).

The following special-case rules, which can be derived from the rules in the LOG, MUL, and EXP instructions, apply to exponentiation:
1. RoughApproxPower(NaN, <x>)=NaN,
2. RoughApproxPower(<x>, <y>)=NaN, if x<=−0.0, 3. RoughApproxPower(+/−0.0, <x>)=+0.0, if x>+0.0, or +INF, if x<−0.0,
4. RoughApproxPower(+1.0, <x>)=+1.0, if x is not NaN,
5. RoughApproxPower(+INF, <x>)=+INF, if x>+0.0, or +0.0, if x<−0.0,
6. RoughApproxPower(<x>, +/−0.0)=+1.0, if x>=−0.0
7. RoughApproxPower(<x>, +INF)=+0.0, if −0.0<=x<+1.0, +INF, if x>+1.0,
8. RoughApproxPower(<x>, +INF)=+INF, if −0.0<=x<+1.0, +0.0, if x>+1.0,
9. RoughApproxPower(<x>, +1.0)=<x>, if x>=+0.0, and
10. RoughApproxPower(<x>, NaN)=NaN.

LOG: Logarithm Base 2 (Approximate)

The LOG instruction computes a rough approximation of the base 2 logarithm of the scalar operand. The approximation is returned in the "z" component of the result vector. A vertex program can also use the "x" and "y" components of the result vector to generate a more accurate approximation by evaluating the following in Table 23T.

TABLE 23T result.x + f(result.y), where f(x) is a user-defined function that approximates 2^x over the domain [1.0, 2.0). The "w" component of the result vector is always 1.0.

The exact behavior is specified in the following pseudo-code. See Table 23T-1.

TABLE 23T-1 tmp = ScalarLoad(op0);
result.x = floor(log2(tmp));
result.y = tmp / floor(log2(tmp));
result.z = RoughApproxLog2(tmp);
result.w = 1.0;

The approximation function is accurate to at least 11 bits. See Table 23T-2.

TABLE 23T-2

| RoughApproxLog2(x) − log_2(x) | < 1.0 / 2^11.

The following special-case rules apply to the LOG instruction:
1. RoughApproxLog2(NaN)=NaN.
2. RoughApproxLog2(+INF)=+INF.
3. RoughApproxLog2(+/−0.0)=−INF.
4. RoughApproxLog2(x)=NaN, −INF<x<−0.0.
5. RoughApproxLog2(−INF)=NaN.

The LOG instruction is present for compatibility with the original NV_vertex_program instruction set; it is recommended that applications using NV_vertex_program2 use the LG2 instruction instead.

MAD: Multiply And Add

The MAD instruction performs a component-wise multiply of the first two operands, and then does a component-wise add of the product to the third operand to yield a result vector. See Table 23U.

TABLE 23U tmp0 = VectorLoad(op0);
tmp1 = VectorLoad(op1);
tmp2 = VectorLoad(op2);

TABLE 23U-continued result.x = tmp0.x * tmp1.x + tmp2.x;
result.y = tmp0.y * tmp1.y + tmp2.y;
result.z = tmp0.z * tmp1.z + tmp2.z;
result.w = tmp0.w * tmp1.w + tmp2.w;

All special case rules applicable to the ADD and MUL instructions apply to the individual components of the MAD operation as well.

MAX: Maximum

The MAX instruction computes component-wise maximums of the values in the two operands to yield a result vector. See Table 23V.

TABLE 23V tmp0 = VectorLoad(op0);
tmp1 = VectorLoad(op1);
result.x = max(tmp0.x >, tmp1.x) ? tmp0.x : tmp1.x;);
result.y = max(tmp0.y >, tmp1.y) ? tmp0.y : tmp1.y;);
result.z = max(tmp0.z >, tmp1.z) ? tmp0.z : tmp1.z;);
result.w = max(tmp0.w >, tmp1.w) ? tmp0.w : tmp1.w;);

The following special cases apply to the maximum operation:
1. max(A,B) is always equivalent to max(B,A).
2. max(NaN, <x>)==NaN, for all <x>.

MIN: Minimum

The MIN instruction computes component-wise minimums of the values in the two operands to yield a result vector. See Table 23W.

TABLE 23W tmp0 = VectorLoad(op0);
tmp1 = VectorLoad(op1);
result.x = min(tmp0.x >, tmp1.x) ? tmp1.x : tmp0.x;);
result.y = min(tmp0.y >, tmp1.y) ? tmp1.y : tmp0.y;);
result.z = min(tmp0.z >, tmp1.z) ? tmp1.z : tmp0.z;);
result.w = min(tmp0.w >, tmp1.w) ? tmp1.w : tmp0.w;);

The following special cases apply to the minimum operation:
1. min(A,B) is always equivalent to min(B,A).
2. min(NaN, <x>)==NaN, for all <x>.

MOV: Move

The MOV instruction copies the value of the operand to yield a result vector. See Table 23X.

TABLE 23X result = VectorLoad(op0);

MUL: Multiply

The MUL instruction performs a component-wise multiply of the two operands to yield a result vector. See Table 23Y.

TABLE 23Y tmp0 = VectorLoad(op0);
tmp1 = VectorLoad(op1);
result.x = tmp0.x * tmp1.x;
result.y = tmp0.y * tmp1.y;
result.z = tmp0.z * tmp1.z;
result.w = tmp0.w * tmp1.w;

The following special-case rules apply to multiplication:
1. "A*B" is always equivalent to "B*A".
2. NaN*<x>=NaN, for all <x>.
3. +/−0.0*<x>=+/−0.0, for all <x> except NaN. The sign of the result is positive if the signs of the two operands match and negative otherwise.
4. +/−INF*<x>=+/−INF, for all <x> except −0.0, +0.0, and NaN. The sign of the result is positive if the signs of the two operands match and negative otherwise.
5. +1.0*<x>=<x>, for all <x>.

RCC: Reciprocal (Clamped)

The RCC instruction approximates the reciprocal of the scalar operand, clamps the result to one of two ranges, and replicates the clamped result to all four components of the result vector.

If the approximate reciprocal is greater than 0.0, the result is clamped to the range $[2^{-64}, 2^{+64}]$. If the approximate reciprocal is not greater than zero, the result is clamped to the range $[-2^{+64}, -2^{-64}]$. See Table 23Z.

TABLE 23Z tmp = ScalarLoad(op0);
result.x = ApproxReciprocal(tmp);
result.y = ApproxReciprocal(tmp);
result.z = ApproxReciprocal(tmp);
result.w = ApproxReciprocal(tmp);

The approximation function is accurate to at least 22 bits. See Table 23Z-1.

TABLE 23Z-1

| ApproxReciprocal(x) − (1/x) | < $1.0 / 2^{22}$, if $1.0 <= x < 2.0$.

The following special-case rules apply to reciprocation:
1. ApproxReciprocal(NaN)=NaN.
2. ApproxReciprocal(+INF)=+0.0.
3. ApproxReciprocal(−INF)=−0.0.
4. ApproxReciprocal(+0.0)=+INF.
5. ApproxReciprocal(+0.0)=+INF.

The RCC instruction is available only in the VP1.1 and VP2 execution environments.

RCP: Reciprocal

The RCP instruction approximates the reciprocal of the scalar operand and replicates it to all four components of the result vector. See Table 23AA.

TABLE 23AA tmp = ScalarLoad(op0);
result.x = ApproxReciprocal(tmp);
result.y = ApproxReciprocal(tmp);
result.z = ApproxReciprocal(tmp);
result.w = ApproxReciprocal(tmp);

The approximation function is accurate to at least 22 bits. See Table 23AA-1

TABLE 23AA-1

| ApproxReciprocal(x) − (1/x) | < $1.0 / 2^{22}$, if $1.0 <= x < 2.0$.

The following special-case rules apply to reciprocation:
1. ApproxReciprocal(NaN)=NaN.
2. ApproxReciprocal(+INF)=+0.0.
3. ApproxReciprocal(−INF)=−0.0.
4. ApproxReciprocal(+0.0)=+INF.
5. ApproxReciprocal(−0.0)=−INF.

RET: Subroutine Call Return

The RET instruction conditionally returns from a subroutine initiated by a CAL instruction by popping an instruction reference off the top of the call stack and transferring control to the referenced instruction. The following pseudocode describes the operation of the instruction. See Table 23AB.

TABLE 23AB

```
if (TestCC(cc.c***) || TestCC(cc.*c**) ||
        TestCC(cc.**c*) || TestCC(cc.***c)) {
    if (callStackDepth <= 0) {
        // terminate vertex program
    } else {
        callStackDepth--;
        instruction = callStack[callStackDepth];
    }
    // continue execution at <instruction>
} else {
    // do nothing
}
```

In the pseudocode, <callStackDepth> is the depth of the call stack, <callStack> is an array holding the call stack, and <instruction> is a reference to an instruction previously pushed onto the call stack. The RET instruction is available only in the VP2 execution environment.

RSQ: Reciprocal Square Root

The RSQ instruction approximates the reciprocal of the square root of the scalar operand and replicates it to all four components of the result vector. See Table 23AC.

TABLE 23AC tmp = ScalarLoad(op0);
result.x = ApproxRSQRT(tmp);
result.y = ApproxRSQRT(tmp);
result.z = ApproxRSQRT(tmp);
result.w = ApproxRSQRT(tmp);

The approximation function is accurate to at least 22 bits. See Table 23AC-1.

TABLE 23AC-1

| ApproxRSQRT(x) − (1/x) | < $1.0 / 2^{22}$, if $1.0 <= x < 4.0$.

The following special-case rules apply to reciprocal square roots:
1. ApproxRSQRT(NaN)=NaN.
2. ApproxRSQRT(+INF)=+0.0.
3. ApproxRSQRT(−INF)=NaN.
4. ApproxRSQRT(+0.0)=+INF.
5. ApproxRSQRT(−0.0)=−INF.
6. ApproxRSQRT(x)=NaN, if −INF<x<−0.0.

SEQ: Set on Equal

The SEQ instruction performs a component-wise comparison of the two operands. Each component of the result vector is 1.0 if the corresponding component of the first operand is equal to that of the second, and 0.0 otherwise. See Table 23AD.

TABLE 23AD tmp0 = VectorLoad(op0);
tmp1 = VectorLoad(op1);

TABLE 23AD-continued

```
result.x = (tmp0.x == tmp1.x) ? 1.0 : 0.0;
result.y = (tmp0.y == tmp1.y) ? 1.0 : 0.0;
result.z = (tmp0.z == tmp1.z) ? 1.0 : 0.0;
result.w = (tmp0.w == tmp1.w) ? 1.0 : 0.0;
if (tmp0.x is NaN or tmp1.x is NaN) result.x = NaN;
if (tmp0.y is NaN or tmp1.y is NaN) result.y = NaN;
if (tmp0.z is NaN or tmp1.z is NaN) result.z = NaN;
if (tmp0.w is NaN or tmp1.w is NaN) result.w = NaN;
```

The following special-case rules apply to SEQ:
1. (<x>==<y>) and (<y>==<x>) always produce the same result.
1. (NaN==<x>) is FALSE for all <x>, including NaN.
2. (+INF==+INF) and (−INF==−INF) are TRUE.
3. (−0.0==+0.0) and (+0.0==−0.0) are TRUE.

The SEQ instruction is available only in the VP2 execution environment.

SFL: Set on False

The SFL instruction is a degenerate case of the other "Set on" instructions that sets all components of the result vector to 0.0. See Table 23AE.

TABLE 23AE

```
result.x = 0.0;
result.y = 0.0;
result.z = 0.0;
result.w = 0.0;
```

The SFL instruction is available only in the VP2 execution environment.

SGE: Set on Greater Than or Equal

The SGE instruction performs a component-wise comparison of the two operands. Each component of the result vector is 1.0 if the corresponding component of the first operands is greater than or equal that of the second, and 0.0 otherwise. See Table 23AF.

TABLE 23AF

```
if (tmp0.x is NaN or tmp1.x is NaN) result.x = NaN;
if (tmp0.y is NaN or tmp1.y is NaN) result.y = NaN;
if (tmp0.z is NaN or tmp1.z is NaN) result.z = NaN;
if (tmp0.w is NaN or tmp1.w is NaN) result.w = NaN;
```

The following special-case rules apply to SGE:
1. (NaN>=<x>) and (<x>>=NaN) are FALSE for all <x>.
2. (+INF >=+INF) and (−INF>=−INF) are TRUE.
3. (−0.0>=+0.0) and (+0.0>=−0.0) are TRUE.

SGT: Set on Greater Than

The SGT instruction performs a component-wise comparison of the two operands. Each component of the result vector is 1.0 if the corresponding component of the first operands is greater than that of the second, and 0.0 otherwise. See Table 23AG.

TABLE 23AG

```
tmp0 = VectorLoad(op0);
tmp1 = VectorLoad(op1);
result.x = (tmp0.x > tmp1.x) ? 1.0 : 0.0;
result.y = (tmp0.y > tmp1.y) ? 1.0 : 0.0;
result.z = (tmp0.z > tmp1.z) ? 1.0 : 0.0;
result.w = (tmp0.w > tmp1.w) ? 1.0 : 0.0;
if (tmp0.x is NaN or tmp1.x is NaN) result.x = NaN;
```

TABLE 23AG-continued

```
if (tmp0.y is NaN or tmp1.y is NaN) result.y = NaN;
if (tmp0.z is NaN or tmp1.z is NaN) result.z = NaN;
if (tmp0.w is NaN or tmp1.w is NaN) result.w = NaN;
```

The following special-case rules apply to SGT:
1. (NaN><x>) and (<x>>NaN) are FALSE for all <x>.
2. (−0.0 >+0.0) and (+0.0>−0.0) are FALSE.

The SGT instruction is available only in the VP2 execution environment.

SIN: Sine

The SIN instruction approximates the sine of the angle specified by the scalar operand and replicates it to all four components of the result vector. The angle is specified in radians and does not have to be in the range [0,2*PI]. See Table 23AH.

TABLE 23AH

```
tmp = ScalarLoad(op0);
result.x = ApproxSine(tmp);
result.y = ApproxSine(tmp);
result.z = ApproxSine(tmp);
result.w = ApproxSine(tmp);
```

The approximation function is accurate to at least 22 bits with an angle in the range [0,2*PI]. See Table 23AH-1.

TABLE 23AH-1

| ApproxSine(x) − sin(x) | < 1.0 / 2^22, if 0.0 <= x < 2.0 * PI.

The error in the approximation may typically increase with the absolute value of the angle when the angle falls outside the range [0,2*PI].

The following special-case rules apply to cosine approximation:
1. ApproxSine(NaN)=NaN.
2. ApproxSine(+/−INF)=NaN.
3. ApproxSine(+/−0.0)=+/−0.0. The sign of the result is equal to the sign of the single operand.

The SIN instruction is available only in the VP2 execution environment.

SLE: Set on Less Than or Equal

The SLE instruction performs a component-wise comparison of the two operands. Each component of the result vector is 1.0 if the corresponding component of the first operand is less than or equal to that of the second, and 0.0 otherwise. See Table 23AI.

TABLE 23AI

```
tmp0 = VectorLoad(op0);
tmp1 = VectorLoad(op1);
result.x = (tmp0.x <= tmp1.x) ? 1.0 : 0.0;
result.y = (tmp0.y <= tmp1.y) ? 1.0 : 0.0;
result.z = (tmp0.z <= tmp1.z) ? 1.0 : 0.0;
result.w = (tmp0.w <= tmp1.w) ? 1.0 : 0.0;
if (tmp0.x is NaN or tmp1.x is NaN) result.x = NaN;
if (tmp0.y is NaN or tmp1.y is NaN) result.y = NaN;
if (tmp0.z is NaN or tmp1.z is NaN) result.z = NaN;
if (tmp0.w is NaN or tmp1.w is NaN) result.w = NaN;
```

The following special-case rules apply to SLE:
1. (NaN<=<x>) and (<x><=NaN) are FALSE for all <x>.
2. (+INF <=+INF) and (−INF <=−INF) are TRUE.
3. (−0.0<=+0.0) and (+0.0<=−0.0) are TRUE.

The SLE instruction is available only in the VP2 execution environment.

SLT: Set on Less Than

The SLT instruction performs a component-wise comparison of the two operands. Each component of the result vector is 1.0 if the corresponding component of the first operand is less than that of the second, and 0.0 otherwise. See Table 23AJ.

TABLE 23AJ tmp0 = VectorLoad(op0);
tmp1 = VectorLoad(op1);
result.x = (tmp0.x < tmp1.x) ? 1.0 : 0.0;
result.y = (tmp0.y < tmp1.y) ? 1.0 : 0.0;
result.z = (tmp0.z < tmp1.z) ? 1.0 : 0.0;
result.w = (tmp0.w < tmp1.w) ? 1.0 : 0.0;
if (tmp0.x is NaN or tmp1.x is NaN) result.x = NaN;
if (tmp0.y is NaN or tmp1.y is NaN) result.y = NaN;
if (tmp0.z is NaN or tmp1.z is NaN) result.z = NaN;
if (tmp0.w is NaN or tmp1.w is NaN) result.w = NaN;

The following special-case rules apply to SLT:
1. (NaN<<x>) and (<x><NaN) are FALSE for all <x>.
2. (−0.0 <+0.0) and (+0.0<−0.0) are FALSE.

SNE: Set on Not Equal

The SNE instruction performs a component-wise comparison of the two operands. Each component of the result vector is 1.0 if the corresponding component of the first operand is not equal to that of the second, and 0.0 otherwise. See Table 23AK.

TABLE 23AK tmp0 = VectorLoad(op0);
tmp1 = VectorLoad(op1);
result.x = (tmp0.x != tmp1.x) ? 1.0 : 0.0;
result.y = (tmp0.y != tmp1.y) ? 1.0 : 0.0;
result.z = (tmp0.z != tmp1.z) ? 1.0 : 0.0;
result.w = (tmp0.w != tmp1.w) ? 1.0 : 0.0;

The following special-case rules apply to SNE:
1. (<x>!=<y>) and (<y>!=<x>) always produce the same result.
1. (NaN<x>) is TRUE for all <x>, including NaN.
2. (+INF !=+INF) and (−INF !=−INF) are FALSE.
3. (−0.0 !=+0.0) and (+0.0 !=−0.0) are TRUE.

The SNE instruction is available only in the VP2 execution environment.

SSG: Set Sign

The SSG instruction generates a result vector containing the signs of each component of the single operand. Each component of the result vector is 1.0 if the corresponding component of the operand is greater than zero, 0.0 if the corresponding component of the operand is equal to zero, and −1.0 if the corresponding component of the operand is less than zero. See Table 23AL.

TABLE 23AL tmp = VectorLoad(op0);
result.x = SetSign(tmp.x);
result.y = SetSign(tmp.y);
result.z = SetSign(tmp.z);
result.w = SetSign(tmp.w);

The following special-case rules apply to SSG:
1. SetSign(NaN)=NaN.
2. SetSign(−0.0)=SetSign(+0.0)=0.0.
3. SetSign(−INF)=−1.0.
4. SetSign(+INF)=+1.0.
5. SetSign(x)=−1.0, if −INF<x<−0.0.
6. SetSign(x)=+1.0, if +0.0<x<+INF.

The SSG instruction is available only in the VP2 execution environment.

STR: Set on True

The STR instruction is a degenerate case of the other "Set on" instructions that sets all components of the result vector to 1.0. See Table 23AM.

TABLE 23AM result.x = 1.0;
result.y = 1.0;
result.z = 1.0;
result.w = 1.0;

The STR instruction is available only in the VP2 execution environment.

SUB: Subtract

The SUB instruction performs a component-wise subtraction of the second operand from the first to yield a result vector. See Table 23AN.

TABLE 23AN tmp0 = VectorLoad(op0);
tmp1 = VectorLoad(op1);
result.x = tmp0.x − tmp1.x;
result.y = tmp0.y − tmp1.y;
result.z = tmp0.z − tmp1.z;
result.w = tmp0.w − tmp1.w;

The SUB instruction is completely equivalent to an identical ADD instruction in which the negate operator on the second operand is reversed:
1. "SUB R0, R1, R2" is equivalent to "ADD R0, R1, −R2".
2. "SUB R0, R1, −R2" is equivalent to "ADD R0, R1, R2".
3. "SUB R0, R1, |R2|" is equivalent to "ADD R0, R1, −|R2|".
4. "SUB R0, R1, −|R2|" is equivalent to "ADD R0, R1, |R2|".

The SUB instruction is available only in the VP1.1 and VP2 execution environments.

Vertex Arrays for Vertex Attributes

Data for vertex attributes in vertex program mode may be specified using vertex array commands. The client may specify and enable any of sixteen vertex attribute arrays.

The vertex attribute arrays are ignored when vertex program mode is disabled. When vertex program mode is enabled, vertex attribute arrays are used.

The command void VertexAttribPointerNV(uint index, int size, enum type, sizei stride, const void *pointer); describes the locations and organizations of the sixteen vertex attribute arrays. index specifies the particular vertex attribute to be described.

size indicates the number of values per vertex that are stored in the array; size may be one of 1, 2, 3, or 4. type specifies the data type of the values stored in the array.

type may be one of SHORT, FLOAT, DOUBLE, or UNSIGNED_BYTE and these values correspond to the array types short, int, float, double, and ubyte respectively.

The INVALID_OPERATION error is generated if type is UNSIGNED_BYTE and size is not 4. The INVALID_

VALUE error is generated if index is greater than 15. The INVALID_VALUE error is generated if stride is negative.

The one, two, three, or four values in an array that correspond to a single vertex attribute comprise an array element. The values within each array element at stored sequentially in memory. If the stride is specified as zero, then array elements are stored sequentially as well. Otherwise points to the ith and (i+1)st elements of an array differ by stride basic machine units (typically unsigned bytes), the pointer to the (i+1)st element being greater. pointer specifies the location in memory of the first value of the first element of the array being specified.

Vertex attribute arrays are enabled with the EnableClientState command and disabled with the DisableClientState command. The value of the argument to either command is VERTEX_ATTRIB_ARRAYi_NV where i is an integer between 0 and 15; specifying a value of i enables or disables the vertex attribute array with index i. The constants obey VERTEX _ ATTRIB _ ARRAYi_ NV=VERTEX_ATTRIB_ ARRAY0_NV+i.

When vertex program mode is enabled, the ArrayElement command operates as described in this section. Likewise, any vertex array transfer commands that are defined in terms of ArrayElement (DrawArrays, DrawElements, and DrawRangeElements) assume the operation of ArrayElement described in this section when vertex program mode is enabled.

When vertex program mode is enabled, the ArrayElement command transfers the ith element of particular enabled vertex arrays as described below. For each enabled vertex attribute array, it is as though the corresponding command were called with a pointer to element i. For each vertex attribute, the corresponding command is VertexAttrib[size] [type]v, where size is one of [1,2,3,4], and type is one of [s,f,d,ub], corresponding to the array types short, int, float, double, and ubyte respectively.

However, if a given vertex attribute array is disabled, but its corresponding aliased conventional per-vertex parameter's vertex array is enabled, then it is as though the corresponding command were called with a pointer to element i. In this case, the corresponding command is determined as described in the context of ArrayElement.

If the vertex attribute array 0 is enabled, it is as though VertexAttrib[size][type]v(0, . . . ) is executed last, after the executions of other corresponding commands. If the vertex attribute array 0 is disabled but the vertex array is enabled, it is as though Vertex[size][type]v is executed last, after the executions of other corresponding commands.

Vertex State Programs

Vertex state programs share the same instruction set as and a similar execution model to vertex programs. While vertex programs are executed implicitly when a vertex transformation is provoked, vertex state programs are executed explicitly, independently of any vertices. Vertex state programs can write program parameter registers, but may not write vertex result registers. Vertex state programs have not been extended beyond the VP1.0 execution environment, and are offered solely for compatibility with that execution environment.

The purpose of a vertex state program is to update program parameter registers by means of an application-defined program. Typically, an application may load a set of program parameters and then execute a vertex state program that reads and updates the program parameter registers. For example, a vertex state program might normalize a set of unnormalized vectors previously loaded as program parameters. The expectation is that subsequently executed vertex programs would use the normalized program parameters.

Vertex state programs are loaded with the same LoadProgramNV command used to load vertex programs except that the target may be VERTEX_STATE_PROGRAM_NV when loading a vertex state program.

Vertex state programs may conform to a more limited grammar than the grammar for vertex programs. The vertex state program grammar for syntactically valid sequences is the same as the grammar defined herein with the following modified rules. See Table 24.

TABLE 24

| <program> | ::= <vp1-program> |
|---|---|
| <vp1-program> | ::= "!!VSP1.0" <programBody> "END" |
| <dstReg> | ::= <absProgParamReg> |
|  | \| <temporaryReg> |
| <vertexAttribReg> | ::= "v" "[" "0" "]" |

A vertex state program fails to load if it does not write at least one program parameter register.

A vertex state program fails to load if it contains more than 128 instructions.

A vertex state program fails to load if any instruction sources more than one unique program parameter register.

A vertex state program fails to load if any instruction sources more than one unique vertex attribute register (this is necessarily true because only vertex attribute 0 is available in vertex state programs).

The error INVALID_OPERATION is generated if a vertex state program fails to load because it is not syntactically correct or for one of the other reasons listed above.

A successfully loaded vertex state program is parsed into a sequence of instructions. Each instruction is identified by its tokenized name. The operation of these instructions when executed is defined herein.

Executing vertex state programs is legal only outside a Begin/End pair. A vertex state program may not read any vertex attribute register other than register zero. A vertex state program may not write any vertex result register.

The command:

ExecuteProgramNV(enum target, uint id, const float *params);

executes the vertex state program named by id. The target may be VERTEX_STATE_PROGRAM_NV and the id may be the name of program loaded with a target type of VERTEX_STATE_PROGRAM_NV. params points to an array of four floating-point values that are loaded into vertex attribute register zero (the only vertex attribute readable from a vertex state program).

The INVALID_OPERATION error is generated if the named program is nonexistent, is invalid, or the program is not a vertex state program. A vertex state program may not be valid for reasons explained herein.

Tracking Matrices

As a convenience to applications, standard GL matrix state can be tracked into program parameter vectors. This permits vertex programs to access matrices specified through GL matrix commands.

In addition to GL's conventional matrices, several additional matrices are available for tracking. These matrices have names of the form MATRIXi_NV where i is between zero and n–1 where n is the value of the MAX_TRACK_MATRICES_NV implementation dependent constant. The MATRIXi_NV constants obey MATRIXi_NV=MATRIX0_NV+i. The value of MAX_ TRACK_MATRICES_NV may be at least eight. The maximum stack depth for tracking matrices is defined by the MAX_TRACK_MATRIX_STACK_DEPTH_NV and may be at least 1.

The command:

TrackMatrixNV(enum target, uint address, enum matrix, enum transform);

tracks a given transformed version of a particular matrix into a contiguous sequence of four vertex program parameter registers beginning at address.

target may be VERTEX_PROGRAM_NV (though tracked matrices apply to vertex state programs as well because both vertex state programs and vertex programs shared the same program parameter registers).

matrix may be one of NONE, MODELVIEW, PROJECTION, TEXTURE, TEXTUREi_ARB (where i is between 0 and n−1 where n is the number of texture units supported), COLOR (if the ARB_imaging subset is supported), MODELVIEW_PROJECTION_NV, or MATRIXi_NV.

transform may be one of IDENTITY_NV, INVERSE_NV, TRANSPOSE_NV, or INVERSE_TRANSPOSE_NV. The INVALID_VALUE error is generated if address is not a multiple of four.

The MODELVIEW_PROJECTION_NV matrix represents the concatenation of the current modelview and projection matrices. If M is the current modelview matrix and P is the current projection matrix, then the MODELVIEW_ PROJECTION_NV matrix is C and computed as C=P M.

Matrix tracking for the specified program parameter register and the next consecutive three registers is disabled when NONE is supplied for matrix. When tracking is disabled the previously tracked program parameter registers retain the state of their last tracked values. Otherwise, the specified transformed version of matrix is tracked into the specified program parameter register and the next three registers. Whenever the matrix changes, the transformed version of the matrix is updated in the specified range of program parameter registers. If TEXTURE is specified for matrix, the texture matrix for the current active texture unit is tracked. If TEXTUREi_ARB is specified for matrix, the <i>th texture matrix is tracked.

Matrices are tracked row-wise meaning that the top row of the transformed matrix is loaded into the program parameter address, the second from the top row of the transformed matrix is loaded into the program parameter address+1, the third from the top row of the transformed matrix is loaded into the program parameter address+2, and the bottom row of the transformed matrix is loaded into the program parameter address+3. The transformed matrix may be identical to the specified matrix, the inverse of the specified matrix, the transpose of the specified matrix, or the inverse transpose of the specified matrix, depending on the value of transform.

When matrix tracking is enabled for a particular program parameter register sequence, updates to the program parameter using ProgramParameterNV commands, a vertex program, or a vertex state program are not possible. The INVALID_OPERATION error is generated if a ProgramParameterNV command is used to update a program parameter register currently tracking a matrix.

The INVALID_OPERATION error is generated by ExecuteProgramNV when the vertex state program requested for execution writes to a program parameter register that is currently tracking a matrix because the program is considered invalid.

Required Vertex Program State

The state required for vertex programs consists of the following in Table 25.

TABLE 25 a bit indicating whether or not program mode is enabled;
a bit indicating whether or not two-sided color mode is enabled;
a bit indicating whether or not program-specified point size mode is enabled;
256 4-component floating-point program parameter registers;
16 4-component vertex attribute registers (though this state is aliased with the current normal, primary color, secondary color, fog coordinate, weights, and texture coordinate sets)
24 sets of matrix tracking state for each set of four sequential program parameter registers, consisting of a n-valued integer indicated the tracked matrix or GL_NONE (where n is 5 + the number of texture units supported + the number of tracking matrices supported) and a four-valued integer indicating the transformation of the tracked matrix;
an unsigned integer naming the currently bound vertex program and the state may be maintained to indicate which integers are currently in use as program names.

Each existent program object consists of a target, a boolean indicating whether the program is resident, an array of type ubyte containing the program string, and the length of the program string array. Initially, no program objects exist.

Program mode, two-sided color mode, and program-specified point size mode are all initially disabled.

The initial state of all 256 program parameter registers is (0,0,0,0).

The initial state of the 16 vertex attribute registers is (0,0, 0,1) except in cases where a vertex attribute register aliases to a conventional GL transform mode vertex parameter in which case the initial state is the initial state of the respective aliased conventional vertex parameter.

The initial state of the 24 sets of matrix tracking state is NONE for the tracked matrix and IDENTITY_NV for the transformation of the tracked matrix.

The initial currently bound program is zero.

The client state required to implement the 16 vertex attribute arrays consists of 16 boolean values, 16 memory pointers, 16 integer stride values, 16 symbolic constants representing array types, and 16 integers representing values per element. Initially, the boolean values are each disabled, the memory pointers are each null, the strides are each zero, the array types are each FLOAT, and the integers representing values per element are each four."

Exemplar errors are set forth in Table 26.

TABLE 26

The error INVALID_VALUE is generated if VertexAttribNV is called where index is greater than 15.
The error INVALID_VALUE is generated if any ProgramParameterNV has an index is greater than 95.
The error INVALID_VALUE is generated if VertexAttribPointerNV is called where index is greater than 15.
The error INVALID_VALUE is generated if VertexAttribPointerNV is called where size is not one of 1, 2, 3, or 4.
The error INVALID_VALUE is generated if VertexAttribPointerNV is called where stride is negative.
The error INVALID_OPERATION is generated if VertexAttribPointerNV is called where type is UNSIGNED_BYTE and size is not 4.
The error INVALID_VALUE is generated if LoadProgramNV is used to load a program with an id of zero.
The error INVALID_OPERATION is generated if LoadProgramNV is used to load an id that is currently loaded with a program of a different program target.
The error INVALID_OPERATION is generated if the program passed to LoadProgramNV fails to load because it is not syntactically correct based on the specified target. The value of TABLE 26-continued PROGRAM_ERROR_POSITION_NV is still updated when this error is generated.
The error INVALID_OPERATION is generated if LoadProgramNV has a target of VERTEX_PROGRAM_NV and the specified program fails to load because it does not write the HPOS register at least once. The value of PROGRAM_ERROR_POSITION_NV is still updated when this error is generated.
The error INVALID_OPERATION is generated if LoadProgramNV has a target of VERTEX_STATE_PROGRAM_NV and the specified program fails to load because it does not write at least one program parameter register. The value of PROGRAM_ERROR_POSITION_NV is still updated when this error is generated.
The error INVALID_OPERATION is generated if the vertex program or vertex state program passed to LoadProgramNV fails to load because it contains more than 128 instructions. The value of PROGRAM_ERROR_POSITION_NV is still updated when this error is generated.
The error INVALID_OPERATION is generated if a program is loaded with LoadProgramNV for id when id is currently loaded with a program of a different target.
The error INVALID_OPERATION is generated if BindProgramNV attempts to bind to a program name that is not a vertex program (for example, if the program is a vertex state program).
The error INVALID_VALUE is generated if GenProgramsNV is called where n is negative.
The error INVALID_VALUE is generated if AreProgramsResidentNV is called and any of the queried programs are zero or do not exist.
The error INVALID_OPERATION is generated if ExecuteProgramNV executes a program that does not exist.
The error INVALID_OPERATION is generated if ExecuteProgramNV executes a program that is not a vertex state program.
The error INVALID_OPERATION is generated if Begin, RasterPos, or a command that performs an explicit Begin is called when vertex program mode is enabled and the currently bound vertex program writes program parameters that are currently being tracked.
The error INVALID_OPERATION is generated if ExecuteProgramNV is called and the vertex state program to execute writes program parameters that are currently being tracked.
The error INVALID_VALUE is generated if TrackMatrixNV has a target of VERTEX_PROGRAM_NV and attempts to track an address is not a multiple of four.
The error INVALID_VALUE is generated if GetProgramParameterNV is called to query an index greater than 95.
The error INVALID_VALUE is generated if GetVertexAttribNV is called to query an <index> greater than 15, or if <index> is zero and <pname> is CURRENT_ATTRIB_NV.
The error INVALID_VALUE is generated if GetVertexAttribPointervNV is called to query an index greater than 15.
The error INVALID_OPERATION is generated if GetProgramivNV is called and the program named id does not exist.
The error INVALID_OPERATION is generated if GetProgramStringNV is called and the program named <program> does not exist.
The error INVALID_VALUE is generated if GetTrackMatrixivNV is called with an <address> that is not divisible by four and not less than 96.
The error INVALID_VALUE is generated if AreProgramsResidentNV, DeleteProgramsNV, GenProgramsNV, or RequestResidentProgramsNV are called where <n> is negative.
The error INVALID_VALUE is generated if LoadProgramNV is called where <len> is negative.
The error INVALID_VALUE is generated if ProgramParameters4dvNV or ProgramParameters4fvNV are called where <count> is negative.
The error INVALID_VALUE is generated if VertexAttribs{1,2,3,4}{d,f,s}vNV is called where <count> is negative.

Exemplary new states are set forth in Table 27.

TABLE 27

| Get Value Attribute | Type | Get Command | Initial Value | Description |
|---|---|---|---|---|
| | 12xR4 | — | (0,0,0,0) | VP1 temporary registers |
| | 16xR4 | — | (0,0,0,0) | VP2 temporary registers |
| | 15xR4 | — | (0,0,0,1) | vertex result registers |
| | Z4 | — | (0,0,0,0) | VP1 address register |
| | 2xZ4 | — | (0,0,0,0) | VP2 address registers |

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents. The order of elements within claims does not indicate any particular order of steps or operations.

What is claimed is:

1. A method for programmable vertex processing, comprising:
identifying a vertex program including branch labels and instruction sequences including branch commands;
converting the vertex program to a binary format capable of being executed by a hardware graphics pipeline;
executing the vertex program in the binary format utilizing the hardware graphics pipeline for transforming vertices; and
writing graphics data to a destination register;
wherein the branch labels and branch commands are used for branching;
wherein the branching occurs conditionally utilizing a register;
wherein the register includes a condition code register;
wherein the condition code register is used to mask the writing of the graphics data to the destination register.

2. The method as recited in claim 1, wherein the vertex program is initially written in a textual format capable of being read by a human prior to being converted.

3. The method as recited in claim 1, wherein the branch labels include branch targets.

4. The method as recited in claim 1, wherein the branching includes computing an index, looking up an entry in a table based on the index, and branching to the instruction associated with the entry.

5. The method as recited in claim 4, wherein the index is computed utilizing an address register.

6. The method as recited in claim 1, wherein the branching occurs conditionally.

7. The method as recited in claim 1, wherein the condition code register includes a multi-component condition code register.

8. The method as recited in claim 1, wherein the condition code register includes a multi-component condition code register for storing a plurality of condition codes.

9. The method as recited in claim 8, wherein the condition codes are associated with x-values, y-values, z-values, and w-values.

10. The method as recited in claim 1, wherein the writing of the graphics data to the destination register is individually masked for each of the x-values, y-values, z-values, and w-values.

11. The method as recited in claim 10, wherein at least one instruction defined by a graphics application program interface is capable of modifying the condition codes.

12. The method as recited in claim 11, wherein each component of the condition code is selected from the group consisting of less than, equal to, greater than, and unordered.

13. The method as recited in claim 12, and further comprising performing tests with the condition codes, the tests selected from the group consisting of less than, greater than, greater than or equal, less than or equal, equal, not equal, false, and true.

14. The method as recited in claim 13, wherein the testing includes programmable testing.

15. A method for programmable vertex processing, comprising:
- identifying a vertex program with branching capabilities;
- converting the vertex program to a binary format capable of being executed by a hardware graphics pipeline;
- executing the vertex program in the binary format utilizing the hardware graphics pipeline for transforming vertices; and
- writing graphics data to a destination register;
- wherein the branching occurs conditionally utilizing a register;
- wherein the register includes a condition code register;
- wherein the condition code register is used to mask the writing of the graphics data to the destination register.

16. A computer program product embodied on a computer readable medium for programmable vertex processing, comprising:
- computer code for identifying a vertex program with branching capabilities;
- computer code for converting the vertex program to a binary format capable of being executed by a hardware graphics pipeline;
- computer code for executing the vertex program in the binary format utilizing the hardware graphics pipeline for transforming vertices; and
- computer code for writing graphics data to a destination register;
- wherein the branching occurs conditionally utilizing a register;
- wherein the register includes a condition code register;
- wherein the condition code register is used to mask the writing of the graphics data to the destination register.

* * * * *